United States Patent [19]

Hair

[11] Patent Number: 5,191,573

[45] Date of Patent: Mar. 2, 1993

[54] METHOD FOR TRANSMITTING A DESIRED DIGITAL VIDEO OR AUDIO SIGNAL

[76] Inventor: Arthur R. Hair, 301 Oaklawn Dr., Pittsburgh, Pa. 15241

[21] Appl. No.: 586,391

[22] Filed: Sep. 18, 1990

Related U.S. Application Data

[63] Continuation of Ser. No. 206,497, Jun. 13, 1988, abandoned.

[51] Int. Cl.⁵ .................... G11B 5/86; G11B 7/00; G11B 11/00
[52] U.S. Cl. ........................ 369/84; 235/381; 235/380; 369/33; 369/34; 369/15; 369/85
[58] Field of Search ............ 369/33, 34, 13, 15, 369/84, 85; 235/380, 381, 375; 364/479, 410

[56] References Cited

U.S. PATENT DOCUMENTS

| | | | |
|---|---|---|---|
| 3,718,906 | 2/1973 | Lightner | 235/381 |
| 3,990,710 | 11/1976 | Hughes | 369/34 |
| 4,567,359 | 1/1986 | Lockwood | 235/381 |
| 4,647,989 | 3/1987 | Geddes | 235/381 |
| 4,654,799 | 3/1987 | Ogaki et al. | 364/479 |

*Primary Examiner*—Hoa Nguyen
*Attorney, Agent, or Firm*—Ansel M. Schwartz

[57] ABSTRACT

The present invention is a method for transmitting a desired digital video or audio signal stored on a first memory of a first party to a second memory of a second party. The method comprises the steps of transferring money via a telecommunications line to the first party from the second party. Additionally, the method comprises the step of then connecting electronically via a telecommunications line the first memory with the second memory such that the desired signal can pass therebetween. Next, there is the step of transmitting the desired digital signal from the first memory with a transmitter in control and in possession of the first party to a receiver having the second memory at a location determined by the second party. The receiver is in possession and in control of the second party. There is also the step of then storing the digital signal in the second memory.

6 Claims, 2 Drawing Sheets

METHOD FOR TRANSMITTING A DESIRED DIGITAL VIDEO OR AUDIO SIGNAL

This is a continuation of copending application Ser. No. 07/206,497 filed on Jun. 13, 1988, now abandoned.

FIELD OF THE INVENTION

The present invention is related to a method for the electronic sales and distribution of digital audio or video signals, and more particularly, to a method which a user may purchase and receive digital audio or video signal from any location which the user has access to a telecommunications line.

BACKGROUND OF THE INVENTION

The three basic mediums (hardware units) of music: records, tapes, and compact discs, greatly restricts the transferability of music and results in a variety of inefficiencies.

CAPACITY: The individual hardware units as cited above are limited as to the amount of music that can be stored on each.

MATERIALS: The materials used to manufacture the hardware units are subject to damage and deterioration during normal operations, handling, and exposure to the elements.

SIZE: The physical size of the hardware units imposes constraints on the quantity of hardware units which can be housed for playback in confined areas such as in automobiles, boats, planes, etc.

RETRIEVAL: Hardware units limit the ability to play, in a sequence selected by the user, songs from different albums. For example, if the user wants to play one song from ten different albums, the user would spend an inordinate amount of time handling, sorting, and cueing the ten different hardware units.

SALES AND DISTRIBUTION: Prior to final purchase, hardware units need to be physically transferred from the manufacturing facility to the wholesale warehouse to &:he retail warehouse to the retail outlet, resulting in lengthly, lag time between music creation and music marketing, as well as incurring unnessary and inefficient transfer and handling costs. Additionally, tooling costs required for mass production of the hardware units and the material cost of the hardware units themselves, further drives up the cost of music to the end user.

QUALITY: Until the recent invention of Digital Audio Music, as used on Compact Discs, distortion free transfer from the hardware units to the stereo system was virtually impossible. Digital Audio Music is simply music converted into a very basic computer language known as binary. A series of commands known as zeros or ones encode the music for future playback. Use of laser retrieval of the binary commands results in distortion free transfer of the music from the compact disc to the stereo system. Quality Digital Audio Music is defined as the binary structure of the Digital Audio Music. Conventional analog tape recording of Digital Audio Music is not to be considered quality inasmuch as the binary structure itself is not recorded. While Digital Audio Music on compact discs is a technological breakthrough in audio quality, the method by which the music is sold, distributed, stored, manipulated, retrieved, played and protected from copyright infringements remains as inefficient as with records and tapes.

COPYRIGHT PROTECTION: Since the invention of tape recording devices, strict control and enforcement of copyright laws have proved difficult and impossible with home recorders. Additionally, the recent invention of Digital Audio Tape Recorders now jeopardizes the electronic copyright protection of quality Digital Audio Music on Compact Discs or Digital Audio Tapes. If music exists on hardware units, it can be copied.

Accordingly, it is an objective of this invention is to provide a new and improved methodology/system to electronically sell and distribute Digital Audio Music.

A further objective of this invention to provide a new and improved methodology/system to electronically store and retrieve Digital Audio Music.

Another objective of this invention is to provide a new and improved methodology/system to electronically manipulate, i.e., sort, cue, and select, Digital Audio Music for playback.

Still another objective of this invention is to offer a new and improved methodology/system which can prevent unauthorized electronic copying of quality Digital Audio Music.

SUMMARY OF THE INVENTION

Briefly, this invention accomplishes the above cited objectives by providing a new and improved methodology/system of electronic sales, distribution, storage, manipulation, retrieval, playback, and copyright protection of Digital Audio Music. The high speed transfer of Digital Audio Music as prescribed by this invention is stored onto one piece of hardware, a hard disk, thus eliminating the need to unnecessarily handle records, tapes, or compact discs on a regular basis. This invention recalls stored music for playback as selected/- programmed by the user. This invention can easily and electronically sort stored music based on many different criteria such as, but not limited to, music category, artist, album, user's favorite songs, etc. An additional feature of this invention is the random playback of songs, also based on the user's selection. For example, the user could have this invention randomly play all jazz songs stored on the user's hard disk, or randomly play all songs by a certain artist, or randomly play all of the user's favorite songs which the user previously electronically "tagged" as favorites. Further, being more specific, the user can electronically select a series of individual songs from different albums for sequential playback.

This invention can be configured to either accept direct input of Digital Audio Music from the digital output of a Compact Disc, such transfer would be performed by the private user, or this invention can be configured to accept Digital Audio Music from a source authorized by the copyright holder to sell and distribute the copyrighted materials, thus guaranteeing the protection of such copyrighted materials. Either method of electronically transfering Digital Audic Music by means of this invention is intended to comply with all copyright laws and restrictions and any such transfer is subject to the appropriate authorization by the copyright holder. Inasmuch as Digital Audio Music is software an this invention electronically transfers and stores such music, electronic sales and distribution of the music can take place via telephone lines onto a hard disk. This new methodology/system of music sales and distribution will greatly reduce the cost of goods sold and will reduce the lag time between music creation and music marketing from weeks down to hours.

The present invention is a method for transmitting a desired digital video or audio signal stored on a first memory of a first party to a second memory of a second party. The method comprises the steps of transferring money via a telecommunications line to the first party from the second party. Additionally, the method comprises the step of then connecting electronically via a telecommunications line the first memory with the second memory such that the desired digital signal can pass therebetween. Next, there is the step of transmitting the desired digital signal from the first memory with a transmitter in control and in possession of the first party to a receiver having the second memory at a location determined by the second party. The receiver is in possession and in control of the second party. There is also the step of then storing the digital signal in the second memory.

Further objectives and advantages of this invention will become apparent as the following description proceeds and the particular features of novelty which characterize this invention will be pointed out in the claims annexed to and forming a part of this declaration.

BRIEF DESCRIPTION OF THE SEVERAL VIEWS OF DRAWINGS

For a better understanding of this invention, reference should be made to the following detailed description, taken in conjunction with the accompanying drawings, in which:

FIG. 1 is a pictorial flow chart which may be used in carrying out the teachings of this invention for the purposes of electronic sales, distribution, storage, manipulation, retrieval, playback, and copyright protection of Digital Audio Music; and FIG. 2 is a pictorial flow chart which may be used in carrying out the teachings of this invention for the purposes of electronic storage, manipulation, retrieval, and playback of Digital Audio Music.

DESCRIPTION OF THE PREFERRED EMBODIMENT

Referring now to the FIG. 1, this invention is comprised of the following:
10 Hard Disk of the copyright holder
20 Control Unit of the copyright holder
  20a Control Panel
  20b Control Integrated Circuit
  20c Sales Random Access Memory Chip
30 Telephone Lines/Input Transfer
50 Control Unit of the user
  50a Control Panel
  50b Control Integrated circuit
  50c Incoming Random Access Memory Chip
  50d Play Back Random Access Memory Chip
60 Hard Disk of the user
70 Video Display Unit
80 Stereo Speakers The Hard Disk 10 of the agent authorized to electronically sell and distribute the copyrighted Digital Audio Music is the originating source of music in the configuration as outlined in FIG. 1. The Control Unit 20 of the authorized agent is the means by which the electronic transfer of the Digital Audio Music from the agent's Hard Disk 10 via the Telephone Lines 30 to the user's Control Unit 50 is possible. The user's Control Unit would be comprised of a Control Panel 50a, a Control Integrated Circuit 50b, an Incoming Random Access Memory Chip 50c, and a Play Back Random Access Memory Chip 50d. Similarly, the authorized agent's Control Unit 20 would have a control panel and control integrated circuit similar to that of the user's Control Unit 50. The authorized agent's Control Unit 20, however, would only require the Sales Random Access Memory Chip 20c. The other components in FIG. 1 include a Hard Disk 60, a Video (display Unit 70, and a set of Stereo Speakers 80.

Referring now to FIG. 2, with the exception of a substitution of a Compact Disc Player 40 (as the initial source of Digital Audio Music) for the agent's Hard Disk 10, the agent's Control Unit 20, and the Telephone Lines 30 in FIG. 1, FIG. 2 is the same as FIG. 1.

In FIG. 1 and FIG. 2, the following components are already commercially available: the agent's Hard Disk 10, the Telephone Lines 30, the Compact Disc Player 40, the user's Hard Disk 60, the Video Display Unit 70, and the Stereo Speakers 80. The Control Units 20 and 50, however, would be designed specifically to meet the teachings of this invention. The design of the control units would incorporate the following functional features:

1) the Control Panels 20a and 50a would be designed to permit the agent and user to program the respective Control Integrated Circuits 20b and 50b, 2) the Control Integrated Circuits 20b and 50b would be designed to control and execute the respective commands of the agent and user and regulate the electronic transfer of Digital Audio Music throughout the system, additionally, the sales Control Integrated Circuit 20b could electronically code the Digital Audio Music in a configuration which would prevent unauthorized reproductions of the copyrighted material, 3) the Sales Random Access Memory Chip 20c would be designed to temporarily store user purchased Digital Audio Music for subsequent electronic transfer via telephone lines to the user's Control Unit 50, 4) the Incoming Random Access Memory Chip 50c would be designed to temporarily store Digital Audio Music for subsequent electronic storage to the user's Hard Disk 60, 5) the Play Back Random Access Memory Chip 50d would be designed to temporarily store Digital Audio Music for sequential playback.

The foregoing description of the Control Units 20 and 50 is intended as an example only and thereby is not restrictive with respect to the exact number of components and/or its actual design.

Once the Digital Audio Music has been electronically stored onto the user's Hard Disk 60, having the potential to store literally thousands of songs, the user is free to perform the many functions of this invention. To play a stored song, the user types in the appropriate commands on the Control Panel 50a, and those commands are relayed to the Control Integrated Circuit 50b which retrieves the selected song from the Hard Disk 60. When a song is retrieved from the Hard Disk 60 only a replica of the permanently stored song is retrieved. The permanently stored song remains intact on the Hard Disk 60, thus allowing repeated playback. The Control Integrated Circuit 50b stores the replica onto the Play Back Random Access Memory Chip 50d at a high transfer rate. The Control Integrated Circuit 50b then sends the electronic output to the Stereo Speakers 80 at a controlled rate using the Play Back Random Access Memory Chip 50d as a temporary staging point for the Digital Audio Music.

Unique to this invention is that the Control Unit 50 also serves as the user's personal disk jocky. The user may request specific songs to be electronically cued for playback, or may request the Control Unit 50 to randomly select songs based on the user's criteria. All of these commands are electronically stored in random access memory enabling the control unit to remember prior commands while simultaneously performing other tasks requested by the user and, at the same &time, continuing to play songs previously cued.

Offering a convenient visual display of the user's library of songs is but one more new and improved aspect of this invention. As the Control Unit 50 is executing the user's commands to electronically sort, select, randomly play, etc., the Video Display Screen 70 is continually providing feedback to the user. The Video Display Screen 70 can list/scroll all songs stored on the Hard Disk 60, list/scroll all cued songs, display the current command function selected by the user, etc. Further expanding upon the improvements this invention has to offer, the Video Display Screen 70 can display the lyrics of the song being played, as well as the name of the song, album, artist, recording company, date of recording, duration of song, etc. This is possible if the lyrics and other incidental information are electronically stored to the Hard Disk 60 with the Digital Audio Music.

The present invention is a method for transmitting a desired digital video or audio signal stored on a first memory of a first party to a second memory of a second party. The method comprises the steps of transferring money via a telecommunications line to the first party from the second party. Additionally, the method comprises the step of then connecting electronically via a telecommunications line the first memory with the second memory such that the desired digital signal can pass therebetween. Next, there is the step of transmitting the desired digital signal from the first memory with a transmitter in control and in possession of the first party to a receiver having the second memory at a location determined by the second party. The receiver is in possession and in control of the second party. There is also the step of then storing the digital signal in the second memory.

In summary, there has been disclosed a new and improved methodology/system by which Digital Audio Music can be electronically sold, distributed, transferred, and stored. Further, there has been disclosed a new and improved methodology/system by which Digital Audio Music can be electronically manipulated, i.e., sorted, cued, and selected for playback. Further still, there has beer disclosed a new and improved methodology/system by which the electronic manipulation of Digital Audio Music can be visually displayed for the convenience of the user. Additionally, there has been disclosed a new and improved methodology/system by which electronic copyright protection of quality Digital Audio Music is possible through use of this invention.

Since numerous changes may be made in the above described process and apparatus and different embodiments of the invention may be made without departing from the spirit thereof, it is intended that all matter contained in the foregoing description or shown in the accompanying drawings shall be interpreted as illustrative, and not in a limiting sense. Further, it is intended that this invention is not to be limited to Digital Audio Music and can include Digital Video, Digital Commercials, and other applications of digital information.

I claim:

1. A method for transmitting a desired digital audio signal stored on a first memory of a first party to a second memory of a second party comprising the steps of:

transferring money electronically via a telecommunication lien to the first party at a location remote from the second memory and controlling use of the first memory from the second party financially distinct from the first party, said second party controlling use and in possession of the second memory;

connecting electronically via a telecommunications line the first memory with the second memory such that the desired digital audio signal can pass therebetween;

transmitting the desired digital audio signal from the first memory with a transmitter in control and possession of the first party to a receiver having the second memory at a location determined by the second party, said receiver in possession and control of the second party; and storing the digital signal in the second memory.

2. A method as described in claim 1 including after the transferring step, the steps of searching the first memory for the desired digital audio signal; and selecting the desired digital audio signal from the first memory.

3. A method as described in claim 2 wherein the transferring step includes the steps of telephoning the first party controlling use of the first memory by the second party; providing a credit card number of the second party controlling the second memory to the first party controlling the first memory so the second party is charged money.

4. A method for transmitting a desired digital video signal stored on a first memory of a first party to a second memory of a second party comprising the steps of:

transferring money electronically via a telecommunications line to the first party at a location remote from the second memory and controlling use of the first memory, from a second party financially distinct from the first party, said second party in control and in possession of the second memory;

connecting electronically via a telecommunications line the first memory with the second memory such that the desired digital video signal can pass therebetween;

transmitting the desired digital video signal from the first memory with a transmitter in control and possession of the first party to a receiver having the second memory at a location determined by the second party, said receiver in possession and control of the second party; and storing the digital signal in the second memory.

5. A method as described in claim 4 including after the transferring money step, the step of searching the first memory for the desired digital signal and selecting the desired digital signal from the first memory.

6. A method as described in claim 5 wherein the transferring step includes the steps of telephoning the first party controlling use of the first memory by the second party controlling the second memory; providing a credit card number of the second party controlling the second memory to the first party controlling the first memory so the second party controlling the second memory is charged money.

* * * * *

UNITED STATES PATENT AND TRADEMARK OFFICE
CERTIFICATE OF CORRECTION

PATENT NO. : 5,191,573

DATED : March 2, 1993

INVENTOR(S) : Arthur R. Hair

It is certified that error appears in the above—identified patent and that said Letters Patent is hereby corrected as shown below:

Column 1, line 12, replace "signal" with -- signals -- .

Column 1, line 17, replace ":" with -- , i.e., -- .

Column 1, line 38, replace "cueing" with -- queuing -- .

Column 1, line 40, replace "transfered" with -- transferred -- .

Column 1, line 42, replace "&:he" with -- the -- .

Column 1, line 43, replace "lengthly," with -- lengthy -- .

Column 1, line 44, replace "unnessary" with -- unnecessary -- .

Column 1, line 47, after "units", first occurrence, insert -- , -- .

Column 2, line 10, delete "is", second occurrence.

Column 2, line 13, after "invention" insert -- is -- .

Column 2, line 19, replace "cue" with -- queue -- .

Column 2, line 36, delete "-".

Column 2, line 59, replace "transfering" with -- transferring -- .

Column 2, line 59, replace "Audic" with -- Audio -- .

Column 2, line 64, replace "an" with -- and -- .

Column 3, line 36, replace "; and" with -- . -- .

Column 3, line 67, after "unit", second occurrence, insert -- 50 -- .

UNITED STATES PATENT AND TRADEMARK OFFICE
CERTIFICATE OF CORRECTION

PATENT NO. : 5,191,573
DATED : March 2, 1993
INVENTOR(S) : Arthur R. Hair

It is certified that error appears in the above—identified patent and that said Letters Patent is hereby corrected as shown below:

Column 4, line 4, after "panel" insert -- 20a -- .

Column 4, line 5, after "circuit" insert -- 20b -- .

Column 4, line 9, replace "(display" with -- Display -- .

Column 4, lines 32 and 33, replace "system, additionally," with -- system. Additionally, -- .

Column 5, line 4, replace "jocky" with -- jockey -- .

Column 5, line 5, replace "cued" with -- queued -- .

Column 5, line 11, replace "&time" with -- time -- .

Column 5, line 12, replace "cued" with -- queued -- .

Column 5, line 20, replace "cued" with -- queued -- .

Column 5, line 28, replace "to" with -- on -- .

Column 5, line 32, replace "steps" with -- step -- .

Column 5, line 52, replace "cued" with -- queued -- .

Column 5, line 53, replace "beer" with -- been -- .

Column 6, line 9, replace "lien" with -- line -- .

Column 6, line 9, after "party" insert -- , -- .

UNITED STATES PATENT AND TRADEMARK OFFICE
CERTIFICATE OF CORRECTION

PATENT NO. : 5,191,573
DATED : March 2, 1993
INVENTOR(S) : Arthur R. Hair

Page 3 of 3

It is certified that error appears in the above—identified patent and that said Letters Patent is hereby corrected as shown below:

Column 6, line 11, after "memory" insert -- , -- .

Column 6, line 41, after "party" insert -- , -- .
Title page, item [57]
In the abstract, line 4, replace "steps" with -- step -- .

In the abstract, line 9, after "desired" insert -- digital -- .

Signed and Sealed this

Twenty-first Day of December, 1993

Attest:

BRUCE LEHMAN

Attesting Officer

Commissioner of Patents and Trademarks

(12) EX PARTE REEXAMINATION CERTIFICATE (7888th)
United States Patent
Hair

(10) Number: US 5,191,573 C1
(45) Certificate Issued: Nov. 30, 2010

(54) METHOD FOR TRANSMITTING A DESIRED DIGITAL VIDEO OR AUDIO SIGNAL

(75) Inventor: Arthur R. Hair, Pittsburgh, PA (US)

(73) Assignee: DMT Licensing, LLC, Princeton, NJ (US)

Reexamination Request:
No. 90/007,402, Jan. 31, 2005

Reexamination Certificate for:
Patent No.: 5,191,573
Issued: Mar. 2, 1993
Appl. No.: 07/586,391
Filed: Sep. 18, 1990

Certificate of Correction issued Dec. 21, 1993.

Related U.S. Application Data

(63) Continuation of application No. 07/206,497, filed on Jun. 13, 1988, now abandoned.

(51) Int. Cl.
G11B 27/34 (2006.01)
G11B 27/031 (2006.01)
G11B 27/034 (2006.01)
G11B 27/00 (2006.01)
G11B 27/10 (2006.01)
G11B 20/00 (2006.01)
G07F 17/00 (2006.01)
G07F 17/16 (2006.01)
H04N 7/173 (2006.01)

(52) U.S. Cl. .......................... 369/84; 235/380; 235/381; 348/E7.071; 369/15; 369/84; 369/85

(58) Field of Classification Search .................. None
See application file for complete search history.

(56) References Cited

U.S. PATENT DOCUMENTS

| 3,244,809 A | 4/1966 | Fuller et al. |
| 3,602,891 A | 8/1971 | Clark et al. |
| 3,696,297 A | 10/1972 | Otero |
| 3,718,906 A | 2/1973 | Lightner |
| 3,824,597 A | 7/1974 | Berg |
| 3,947,882 A | 3/1976 | Lightner |
| 3,990,710 A | 11/1976 | Hughes |
| 4,028,733 A | 6/1977 | Ulicki |
| 4,045,776 A | 8/1977 | Wheelwright et al. |
| 4,108,365 A | 8/1978 | Hughes |
| 4,124,773 A | 11/1978 | Elkins |
| 4,300,040 A | 11/1981 | Gould et al. |
| 4,335,809 A | 6/1982 | Wain |
| 4,359,223 A | 11/1982 | Baer et al. |
| 4,370,649 A | 1/1983 | Fuerle |

(Continued)

FOREIGN PATENT DOCUMENTS

| GB | 2 178 275 A | 2/1987 |
| JP | 62-284496 | 6/1986 |
| JP | 62-284496 | 12/1987 |

OTHER PUBLICATIONS

"The History of Recordings", Recording Industry of Association, retrieved from http://www.riaa.com/issues/audio/hisotry.asp on Sep. 19, 2006.*

(Continued)

Primary Examiner—Roland G Foster

(57) ABSTRACT

The present invention is a method for transmtting a desired digital video or audio signal stored on a first memory of a first party to a second memory of a second party. The method comprises the step of transferring money via a telecommunications line to the first party from the second party. Additionally, the method comprises the step of then connecting electronically via a telecommunications line the first memory with the second memory such that the desired digital signal can pass therebetween. Next, there is the step of transmitting the desired digital signal from the first memory with a transmitter in control and in possession of the first party to a receiver having the second memory at a location determined by the second party. The receiver is in possession and in control of the second party. There is also the step of then storing the digital signal in the second memory.

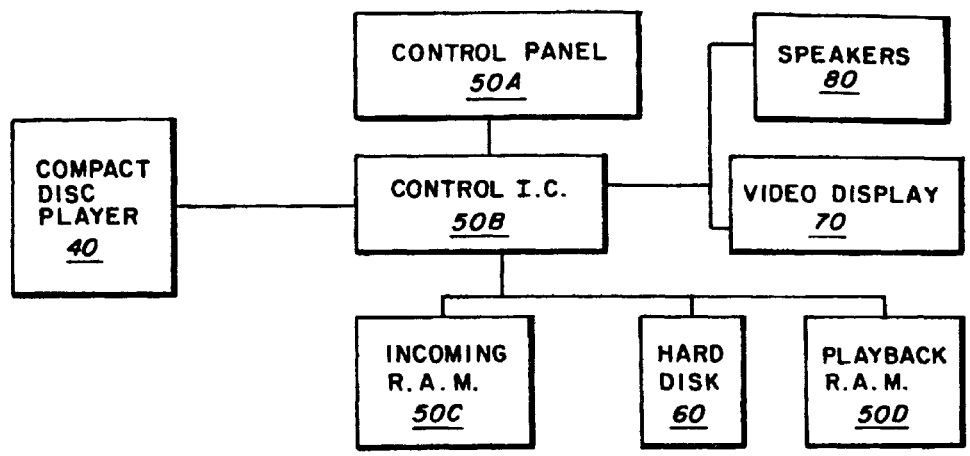

U.S. PATENT DOCUMENTS

Figure 1:
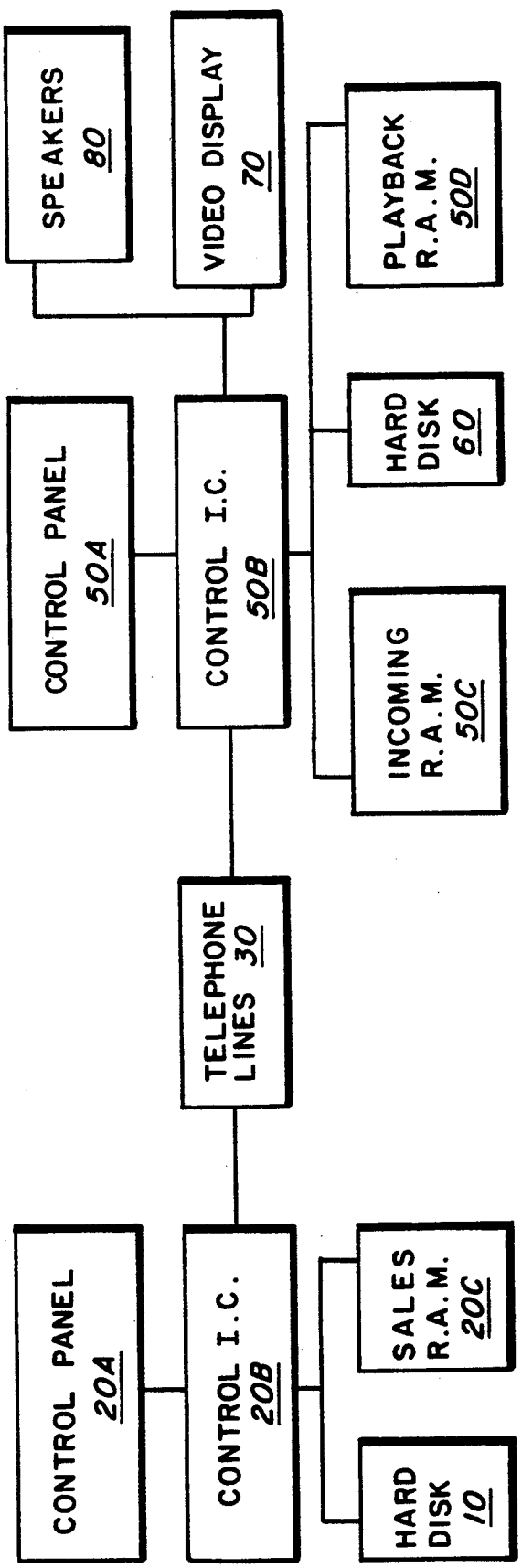
Figure 2:
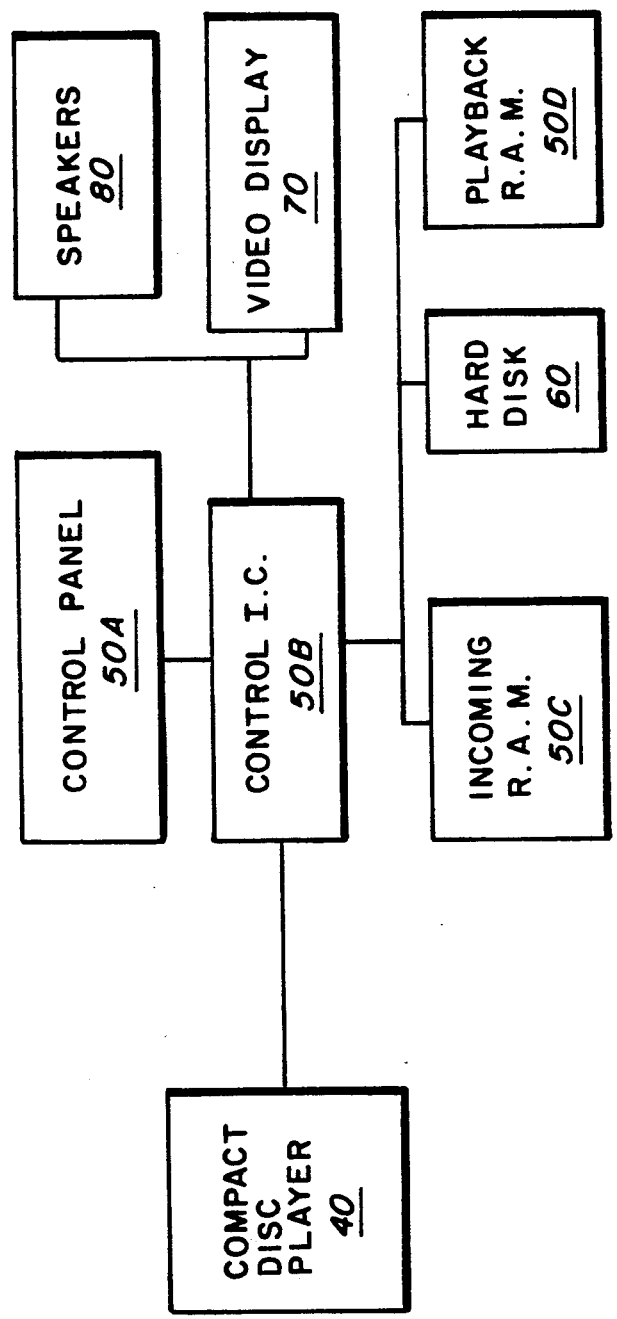

| | | | |
|---|---|---|---|
| 4,422,093 A | | 12/1983 | Pargee |
| 4,472,747 A | | 9/1984 | Schwartz |
| 4,499,568 A | | 2/1985 | Gremillet |
| 4,506,387 A | | 3/1985 | Walter |
| 4,520,404 A | | 5/1985 | Von Kohorn |
| 4,521,806 A | | 6/1985 | Abraham |
| 4,521,857 A | | 6/1985 | Reynolds, III |
| 4,528,643 A | | 7/1985 | Freeny, Jr. |
| 4,533,948 A | | 8/1985 | McNamara et al. |
| 4,536,856 A | | 8/1985 | Hiroishi |
| 4,538,176 A | | 8/1985 | Nakajimo et al. |
| 4,559,570 A | | 12/1985 | Schwartz |
| 4,567,359 A | | 1/1986 | Lockwood |
| 4,567,512 A | | 1/1986 | Abraham |
| 4,605,973 A | | 8/1986 | Von Kohorn |
| 4,636,876 A | | 1/1987 | Schwartz |
| 4,647,989 A | | 3/1987 | Geddes |
| 4,648,037 A | | 3/1987 | Valentino |
| 4,654,799 A | | 3/1987 | Ogaki |
| 4,658,093 A | | 4/1987 | Hellman |
| 4,667,802 A | | 5/1987 | Verduin et al. |
| 4,672,613 A | | 6/1987 | Foxworthy et al. |
| 4,674,055 A | | 6/1987 | Ogaki |
| 4,675,904 A | | 6/1987 | Silverman |
| 4,682,248 A | | 7/1987 | Schwartz |
| 4,688,105 A | | 8/1987 | Bloch et al. |
| 4,703,465 A | | 10/1987 | Parker |
| 4,725,977 A | | 2/1988 | Izumi et al. |
| 4,739,510 A | | 4/1988 | Jeffers et al. |
| 4,754,483 A | | 6/1988 | Weaver |
| 4,755,872 A | | 7/1988 | Bestler et al. |
| 4,755,889 A | | 7/1988 | Schwartz |
| 4,758,908 A | | 7/1988 | James |
| 4,759,060 A | | 7/1988 | Hayashi et al. |
| 4,761,684 A | | 8/1988 | Clark et al. |
| 4,763,317 A | | 8/1988 | Lehman et al. |
| 4,766,581 A | | 8/1988 | Korn et al. |
| 4,787,050 A | | 11/1988 | Suzuki |
| 4,787,073 A | * | 11/1988 | Masaki .................. 369/178.01 |
| 4,789,863 A | | 12/1988 | Bush |
| 4,792,849 A | | 12/1988 | McCalley et al. |
| 4,797,918 A | | 1/1989 | Lee et al. |
| 4,829,372 A | | 5/1989 | McCalley et al. |
| 4,855,979 A | * | 8/1989 | Kimura et al. ................. 369/98 |
| 4,870,515 A | * | 9/1989 | Stokes ....................... 360/72.2 |
| 4,894,789 A | | 1/1990 | Yee |
| 4,918,588 A | | 4/1990 | Barrett et al. |
| 4,949,187 A | | 8/1990 | Cohen |
| 4,949,257 A | | 8/1990 | Orbach |
| 4,999,806 A | | 3/1991 | Chernow et al. |
| 5,003,384 A | | 3/1991 | Durdan et al. |
| 5,019,900 A | | 5/1991 | Clark et al. |
| 5,041,921 A | | 5/1991 | Skerker et al. |
| 5,089,885 A | | 2/1992 | Clark |
| 5,099,422 A | | 3/1992 | Foresman et al. |
| 5,130,792 A | | 7/1992 | Tindell et al. |
| 5,132,992 A | | 7/1992 | Yurt et al. |
| 5,191,193 A | | 3/1993 | Le Roux |
| 5,191,410 A | | 3/1993 | McCalley et al. |
| 5,191,573 A | | 3/1993 | Hair |
| 5,241,428 A | * | 8/1993 | Goldwasser et al. ........ 386/109 |
| 5,307,456 A | | 4/1994 | MacKay |
| 5,428,606 A | | 6/1995 | Moskowitz |
| RE35,184 E | | 3/1996 | Walker |
| 5,535,137 A | * | 7/1996 | Rossmere et al. ........... 358/537 |
| 5,675,734 A | | 10/1997 | Hair |
| 5,966,440 A | | 10/1999 | Hair |

OTHER PUBLICATIONS

"History of CD Technology", citing as a source "The compact Disc Handbook, 2nd Edition," by Ken C. Pohlmann, retrieved from http://www.oneoffcd.com/info/hisotrycd.cm on Sep.19, 2006.*

"History of MPEG", University of California, Berkeley, School of Information Management and Systems, retrieved from http://www2.sims.berkeley.edu/courses/is224/s99/GroupG/report1.html on Sep. 19, 2006.*

"IBM HDD Evolution" chart, by Ed Grochowski at Almaden, retrieved from http://www.soragereview.com/guideImages/z_ibm_sorageevolution.gif on Sep. 19, 2006.*

Apple Inc., Form 10–Q, Apr. 21, 2010.

Blockbuster Changes Course of In–store Duplication Plans, Multimedia & Videodisc Monitor, vol. 12, No. 6, Jun. 1, 1994 (1 page).

Blockbuster Reaffirms Video Retailing Roots, Video Week, vol. 14, No. 19, May 17, 1993 (2 pages).

Blockbuster To Test Videogame Downloads In Summer, Audio Week, vol. 6, No. 12, Mar. 28, 1994 (2 pages).

IBM, Blockbuster join forces on CD venture; Associated Press, May 12, 1993 (2 pages).

Magistrate's Report and Recommendation (Amending Claim Construction), *Sightsound.com* v. *NSK et al.*, Civil Action No. 98–118, Apr. 2, 2002.

Magistrate's Report and Recommendation (on Claim Construction), *Sightsound.com* v. *NSK et al.*, Civil Action No. 98–118, Feb. 8, 2002.

Memorandum Order of Court (adopting amended claim construction recommendation),*Sightsound.com* v. *NSK et al.*, Civil Action No. 98–118, Nov. 27, 2002.

Music burning kiosks: On the right track; Self Service and Kiosk Association, Apr. 9, 2007 (4 pages).

Sony Music Plans to Test Use of In–Store Digital Kiosks, New York Times, Jun. 10, 1999.

Starbucks shuts down its Hear Music kiosks, May 2006 (http://brandautopsy.typepad.com/brandautopsy/2006/05/starbucks_shuts.html).

Turning Over New Leaf, Consumer Electronics, Feb. 13, 1995 (1 page).

Jordan, Larry E. and Churchill, Bruce, *Communications and Networking for the IBM PC*, Robert J. Brady Co., Bowie, MD (1983).

W. Rosch, "ComNet for the PC," *PC Magazine*, Aug. 1983, pp. 225–228.

E. Ferrarini, "Direct Connections for Software Selections," *Business Computer Systems*, Feb. 1984, pp. 35+ (4 pages total).

P. Elmer–DeWitt, "Calling up an on–line cornucopia; computer networks are supermarkets of services and information," *Time*, Apr. 7, 1986 (two–page electronic version obtained at http://www.highbeam.com).

From the newS desk, D. Needle, Info World, May 11, 1984.

Computer system organization: Problems of the 1980's, H. Apfelbaum, et al., Computer Sep. 1978, vol. II, No. 9.

System for capturing, storing and playing back large data bases at home, D.C. Gazis S.S. Soo, IBM Technical Disclosure Bulletin, vol. 23, No. 2, p. 856, Jul. 1980.

Jimmy Bowen: Music Row's Prophet of change, L. Chappell, Advantage, vol. 9, No. 10, p. 38, Oct. 1986.

Rock Around the Database, L. Dotto, Information Technal., vol. 57, No. 9, pp. 128–135, Sep. 1984.

Home (computer) terminal musical program selection, P.L. Rosenfeld, IBM Technical Disclosure Bulletin, vol. 23, No. 78, p. 3440.

A Harmonious Musical Interface, S. Cunningham, Network World, Inc., Sep. 8, 1986.

Electronic Orchestra in your livingroom, S. Mace, InfoWorld, Mar. 25, 1985, p. 29.

Cable Scan, No Author, Oct. 1983.

A review of digital audio techniques, M. Willocks, Journal of the Audio Engineering Society, vol. 26, No. 12, pp. 56, 58, 60, 62, 64, Jan.–Feb. 1978.

Digital Music Will Launch the Home Music Store, G. Gulick, Satellite News, 81–11–09, pp. 7.

Telecommunications in the coming decades, S.B. Weinstein, IEE Spectrum, Nov. 19??, p. 62.

Electronic Banking Goes to Market, T.S. Perry, IEE Spectrum, Feb. 19??, p. 46.

Gordon Bell calls for a U.S. Research Network, G. Gordon Bell, IEEE Spectrum, p. 54.

As Patents Multiply, Web Sites Find Lawsuits Are a Click Away, S. Hansell, New York Times, Dec. 11, 1999, A1.

The Tony Basile Home Page, The PAN Network, The PAN Network, Dec. 12, 1999.

Tele computing—Direct Connections for Software Selections, E. Ferrarini, Business computer systems, Feb. 1984.

Young Arcadians Come Home, D.N., Info World, vol. 5, No. 27.

Two way Cable System Using Residential CATV Facilities, Semir Sirazi, et al, ICCE 84, Jun. 7, 1984, LaSalle III—Digest of Technical Papers.

News, D. Caruso, InfoWorld, Apr. 16, 1984.

Pay Per View Entertainment System, PTO, US Patent and Trademark Office, Patent Bibliographic Database, Jan. 26, 2000.

Software Distribution System, PTO, US Patent and Trademark Office, patent Bibliographic Database, Jan. 26, 2000.

Dig–Music: An On Demand Digital Music Selection System utilizing CATV Facilities, Y. Want G.M. Campbell, IEEE Transactions on Consumer Electronics, vol. CE 28, No. 3, Aug. 1982, p. x vii.

Transmission of Musical Info. in a teletext multiplexed broadcasting system, Y. Sugimori, et al., IEEE International Conference on Consumer Electronics, 1985—Digest of Technical Papers.

An Encrypted Digital Audio System for Conventional Cable System, K. Kitagawa, et al., IEEE International Conference on Consumer Electroncs, 1985—Digest of Technical Papers.

Telephone computers—a look at the one per Desk Telecomputer, D. Pountain, Byte U.K., Jun. 1985.

Music Software for the Apple Macintosh, C. Yavelow, Computer Music Journal, vol. 9, No. 3, Fall 1985.

NAPLPS Videotex Frame Creation System with Automatic Encoding of Input Images, T. Fujimori, IEEE Transactions on Consumer Electronics, vol. CE–31, No. 3, Aug. 1985.

Picture Transmission for Videotex, K. Ngan, et al., IEEE Transactions on Consumer Electronics, vol. CE–31, No. 3, Aug. 1985.

A System for Transmitting Electronic Photographs, N. Kihara, et al., IEEE Transactions on Consumer electronics, vol. CE–28, No. 3, Aug. 1982.

A Low cost High Performance Picture Display for Photovideotex, G.P. Hudson C.P. Arbuthnot, IEEE Transactions on Consumer Electronics, vol. CE–32, Aug. 1986.

The Coding of Graphics Animation in a Videotext Terminal, C. Pabousctsidis, 1986 IEEE International Conference on Consumer Electronics, Digest of technical Papers, Jun. 1986.

Videotext Programs Videorecorder (VPV), U. Bensch, 1984, IEEE International Conference on Consumer Electronics, Digest of technical Papers, Jun. 1984.

Picture Transmission for Videotex, H. Weng Cheong N. King Ngi, 1988, IEEE International Conference on Consumer Electronics, Digest of technical Papers Jun. 1988Digital Still Picture Recorder Utilizing an Ordinary Audio Cassette DeckS. Kageyama, et al.1985 IEEE International Conference on Consumer Electronics, Digest of technical Papers, Jun. 1985.

Digital Still Picture Recorder Utilizing an Ordinary Audio Cassette Deck, S. Kageyama, et al., 1985 IEEE International Conference on Consumer Electronics, Digest of Technical Papers, Jun. 1985.

A New digital Audio and Data Transmission System Using the CATV Network, Y. Kojima, et al., IEEE Trqansactions on Consumer Electronics, vol. CE–30, No. 3, Aug. 1984.

A Simple Technique for Video Image Transmission, N.D. Jotwani, K.L. Mong, IEEE Transactions on Consumer Electronics, vol. CE–33, No. 1, Feb. 1987.

Third Party Profile: Control Video Corporation, no author, Control Video Corp. Web Site.

Dial–A–Game–GameLine module links WCS with Game Bank, D. Burns, Digital Antic, vol. 2, No. 4, Jul. 1983, p. 82.

Remembering the Gameline, D. Skelton, http://ccwf.ccutexas.edu.

Digitalized Voice Comes of Age Part 1—Trade Offs, B. Occhiogrosso, Data Communications, Mar. 1978.

A New Digital Audio and Data Transmission System Using the CATV Network, Y. Kojima, et al., IEEE Transactions on Consumer Electronics, vol. CE–30, No. 3, Aug. 1984.

A Packet Video/Audio System Using the Asynchronous Transfer Mode Technique, H.J. Chao, et al., IEEE Transactions on Consumer Electronics, vol. 35, No. 2, May 1989.

Digital Audio Data Transmission in a Coaxial Cable Environment, R. Scheuerer, et al, IEEE Transactions on Consumer Electronics, vol. 35, No. 2, May 1989?.

Transmission of Musical info, in a Teletext Multiplexed Broadcasting system, Y. Sugimori, et al, IEEE Transactions on Consumer Electronics, vol. CE–29, No. 3, Aug. 1983.

4004 Futures for Teletext and Videotex in the US, R.P. Plummer, et al, IEEE Transactions on Consumer Electronics, vol. CE–25, No. 3, Jul. 1979.

Teletext/Viewdata LSI, B. Harden, et al., IEEE Transactions on Consumer Electronics, vol. CE–25, No. 3, Jul. 1979.

Prestel—the World's First Public View data Service, R.D. Bright, et al., IEEE Transactions on Consumer Electronics, vol. CE–25, No. 3, Jul.

Teletext and Viewdata (costs as Applied to the US Market, G.O. Crowther, IEEE Transactions on Consumer Electronics, vol. CE–25, No. 3, Jul. 1979.

Telidon—A Review, H. Brown W. Sawchuk, IEEE Communcations Magazine, Jan. 1981.

Videotex Services: Network and Terminal Alternatives, J.M. Costa A.M. Chitnis, IEEE Transactions on Consumer Electronics, vol. CE–25, No. 3, Jul. 1979.

System and Hardware Considerations of Home Terminals With Telephone Computer Access, J. Blank, IEEE Transactions on Consumer Electronics, vol. CE–25, No. 3, Jul. 1979.

Profile—Career Update, Key board News, Apr. 1985.

Telecommunications—Let Your Telephone Do the Sampling, B. Tolinski, KSC, Apr. 1986.

PAN: Meeting Place for the Industry, P. Leopold, Electronic Musician, Sep. 1986.

A Harmonious Musical Interface—Instrument Connectivity is Music to Composer's ears. S. Cunningham, Network World, Sep. 8, 1986 (vol. 3, No. 27).

Teaching Computers to Emulate Bach, J.S. Newton, The New York Times, Sunday, Mar. 1, 1987.

Getting Into PAN, S. Lloyd, Sonics (nothing else appears).

MIDI By Modem: The Future in Now, P. Leopold, Conference Paper—Music and Digital Technology.

The Information Source of the Future is Online now: Electronic Bulletin Boards, G. Armbruster, Keyboard Magazine, Dec. 1985.

MIDI—Musical Instrument Digital Interface, J. Aikin, Keyboard Magazine, Jan. 1986.

Mind Over MIDI—Diary of a Mad MIDI Specialist, J. Cooper, Keyboard Magazine, Jun. 1986.

Cover of the Keyboard Magazine and Advertisement from Hybrid Acts, Inc., Keyboard Magazine, Jul. 1986.

What is Musical Property?—The Ethics of Sampling, S. Alvaro, Keyboard Magazine, Oct. 1986.

Collection of MIDI Stereo Advertisments, Electronic Musician, vol. 5, No. 2, Feb. 1989.

In the Public Eye: Free Atari Software, J. Johnson, Electronic Musician, vol. 5, No. 10, Oct. 1989.

Going Online—A Guide to elec. Bulletin board System, M. Rivers, Electronic Musician, vol. 6, No. 11, Nov. 1990.

Page of EM Classifieds, Electronic Musician, Nov. 1989.

Advertisements, Electronic Musician, Aug. 1989.

EM Classifieds, Electronic Musician, Jul. 1989.

Advertisements, Electronic Musician, Jul. 1989.

Start Me Up?—the Music Biz Meets the personal computer, B. Krepack R. Firestone, Published by Medioc Press, Copyright 1986.

A Harmonious Musical Interface, S. Cunningham, 1986 Network world, Sep. 8, 1986.

Synth—Bank, USPTO, USPTO—Trademark Text and Database.

Managing the Intellectual Property Lifecycle, B. Bell A. Brown, Jr., A excerpt from an article available at Synthbank.com 1998, Synthbank. Inc.

List of E–Bulletin Boards with an attached EM page of ads, ON–line Resources/Electronic Bulletin Boards.

An Upbeat Way to Order; worth watching, G. Charlish, 1988 The Financial Times (Lexis–Nexis).

Musicnet, USPTO, USPTO—Trademark.

PC Forum Attendees Call for Cooperation with Government, S. Higgins, Westlaw, Monday, Mar. 1, 1993.

Data Highways . . . Can we get there from here?, J. Burgess, The Washington Post, May 2, 1993 (Lexis–Nexis).

MNI Interactive to Revolutionize the Way Consumers Select and Purchase Entertainment Products, PR Newswire Association, Jan. 17, 1994.

The Interactive Age—Can The Exalted Vision Become a Reality?, M. W. Miller, The Wall Street Journal, Thursday, Oct. 14, 1993.

Music Net Let's Consumer's Fingers do the Walking, J. McCullaugh, Billboard, Saturday, Oct. 16, 1993 (Westlaw).

"Rolling Stone" Takes Music to The Phone, S. Donaton A. Z. Cuneo, Advertising Age, Jul. 11, 1994 (Lexis–Nexis).

Most Silicon Valley Ventures Beat the Odds, S. Herhold, Knight—Ridder Tribune Business News, Feb. 14, 1999.

Entire Sep. Issue, Electronic Musician, Sep. 1986.

Digit Download—Guidelines for the Architecture of Audio Technical Facilities at an Online Music Retail Site, Preliminary White Paper Version 1.0 Mar. 2, 1999 (CDN 03994–004038).

USPTO Certificate of Correction—Patent No. 4,528,643, System for Reproducing information in material objects at a point at sale location, USPTO.

The Telharmonium: An Early Breakthrough in Electronic Music, T. Holmes, Gyrofrog Communications Electronic and Experimental Music 1996.

Free Music Downloads, CDNow, CDNow Web Site (CDN 000078–85).

Gameline—the Incredible New Way to Play Video Games, Gameline brochure.

Downloading and Tele–delivery of Computer Software, Music and Video, International Resource Development, Inc. (DN 021217–021432).

Downloading and Tele–delivery of Computer Software, Music and Video, International Resource Development, Inc. Jul. 1983 (CDN 021433–021664).

The Development of a Commercial Tele software Service, A. Sweet, Tele software Cavendish Conference Center Sep. 27–28, 1984. Publication No. 60 [61] Institution of Electronic and Radio Engineers.

Tele software—The Computer in Your TV set, J. Hedger, New Electronics, vol. 13, No. 245, Dec. 9, 1980.

Tele Software: Adding Intelligence to Teletext, R. Eason J. Hedger, Proceedings IEEE, vol. 126, No. 12, Dec. 1979.

Receiving Tele Software With CCT, J.R. Kinghorn, Tele software Cavendish Conference Center Sep. 27–28, 1984. Publication No. 60 [61] Institution of Electronic and Radio Engineers.

Games Tele Software on Cable, T.J Havelock, Tele software Cavendish Conference Center Sep. 27–28, 1984. Publication No. 60 [61] Institution of Electronic and Radio Engineers.

Broadcast Tele Software Exerience With ORACLE, J. Hedges, View data and Videotext, 1980–1981: A Worldwide Report.

The UK Teletext Standard for Tele Software Transmissions, D.J. Rayer, View data and Videotext, 1980–1981: A Worldwide Report.

Music from the skies promised by firm serving cable users, S. Chase, The Washington Post, Oct. 19, 1981.

Abstract—L. Landro, The Wall Street Journal, Oct. 14, 1981.

Abstract—No author listed, UPI—Oct. 13, 1981.

Hi–Tech do–Dads for the man of the house, No author listed, Trends.

New Products Programmed for Consumers, No author listed, Computer Report.

Electronics show had variety of new home equipment, No author listed, Hi–Fi News and Record Reviews, 1985.

New Telerecording Method for Audio, No author listed, BM/E, Oct. 1985.

Cable TV Moves To The Music, A.L. Yarrow, NY Times, Jul. 4, 1982.

What is Stalling the Record Business? No author listed, Business Week, Nov. 30, 1981.

Labels Gear Up For Home Music Store, No author listed, Billboard Magazine, Apr. 6, 1991.

The Record Shop of the Future May Be In Your Parlour, Hans Fantel, NY Times, Nov. 22, 1981.
The Latest Technology, R. Harrington, Washington Post, Jun. 28, 1981.
Thaddeus Cahill and the Telharmonium (electric instrument), No author listed, http://nicemusic4.music.niu.edu.
Thaddeus Cahill's Dynamophone/Telharmonium (1897), No author listed, http://www.obsolete.com.
Book Review: Magic Music From The Telharmonium, P. Hertz, http://www.obsolete.com.
Telharmonium, No author listed, http://www.britannica.com.
Keyboard and Tactile Interfaces, No author listed, In The Third Person, Oct. 1999.
No Time To Shop For Software, J. Paioff, InfoWorld, Aug. 20, 1984.
Warner Amex QUBE Cable Communications, No author listed, http://www.electricblue.com.
A Blast From The Past, P. Conger, http://www.cableworld.com, Mar. 28, 1998.
Where Is Everyone Now, No author listed, http://www.electricblue.com.
Juke Box History 1934 thru 1951, Gert Almind, http://ww-w1.jukebox.dk.
The Shyvers Multiphone, No author listed, http://www.dyz.com.
Dead Medium: Telephonic Jukeboxes: The Shyvers Multiphone . . ., B. Sterling, http://www.wps.com.
Downloading and Teledelivery of computer software, games, music, and video, Int'l. Resource Dev. Inc., US Copyright Application, Registration 1–243–407.
Compusonics Digitizes Phone Lines, No author listed, Digital Audio, Sep. 1985.
AT&T Demo, No author listed, Pro Sound News, Sep. 9, 1985.
Videogames and Electronic Toys, Int'l Resources Dev. Inc., May 1983.
Compusonics Eyes Options; Will Flagship Computer Make Direct CD Copies?, M. Harrington, Information Access Co., Mar. 30, 1987.
Direct Broadcast's Potential For Delivering Data Service, E. Holmes, Data Communications, Sep. 1984.
Sonus Music Products, C. Roads, Computer Music Journal, Spring 1987.
Advertisement: Gameline package, http://www.geocities.com.
Computer Music Networks, C. Roads, Computer Music Journal, Fall 1986.
Announcements, C. Roads, Computer Music Journal, Sep. 1986.
CVC Gameline Master Module, No author listed, http://ccwf.cc.utexas.edu.
Oregon Corporate Records, Re: Synth–Bank, Oregon Secretary of State.
Lexis Search Manual (Entire Manual).
Affidavit of Edgar Magnin and Exhibits, US Dist Ct for the Southern Dist. Of New York.
Transcript: Max Conference, Feb. 27, 1993.
Exhibits To Compuserve's Brief On Claim Interpretation, Jones, Day, Reavis & Pogue, Filed in US Dist. Ct. For The Southern Dist. Of New York.
AES Presentations, AES Preprints.
Brochure; Overview articles, etc on PAN, PAN Network.
Brochure: NERAC.
CompuSonics DSP—1000 World's First DARPS, CompuSonics Advertisement.
We Mean Business, C.S. Kaplan, Con. Elec. Daily, May 10, 1984.
Letter to Shareholders, D. Schwartz, CompuSound, Inc. Jan. 6, 1984.
Letter to Shareholders, D.Schwartz, CompuSound, Inc. Apr. 6, 1984.
Letter to Shareholders, D.Schwartz, CompuSound, Inc., Jul. 16, 1984.
Letter to Shareholders, D. Schwartz, CompuSound, Inc., May 31, 1985.
Manufacturing Update, Audio Video Inter. Jun. 1984.
CompuSonics Fuses Computer, Audio Into "Worlds First" HDR, M. Golden, CES Trade News Daily, Jun. 4, 1984.
Digital Sound Now on Computer Disks, S. Booth, Consumer Elec. Daily, Jun. 3, 1984.
CompuSonics Readies Floppy disc to record . . . , HFS Newspaper, Jun. 4, 1984.
Floppy disc may be the next music Makers, Business Week, May 28, 1984.
CompuSonics: Another Digital Audio St., N. Weinstock, MIX, Aug. 1984.
The State of RCA, TV Digest, May 21, 1984.
CompuSonics DSP–1000 . . . , CES Exhibition—D&E, 1984.
Optical—Disk based Digital Audio System, B. Robinson, Electronic Engineering Times, Sep. 1, 1986.
Brochure—CompuSonics DSP–1000, CompuSonics Corp.
Business Plan Overview, CompuSonics, Corp., Jun. 14, 1984.
Compusonics Corp. Corporate Profile, Audio Video International.
Toward Electronic Delivery of Music, J.P. Stautner, CompuSonics Corp.
Company sees Future in Digital, J. Hendon, Rocky MountainNews, Jul. 22, 1984.
Floppy–Disk Audio System, A. Mereson, Science Digest, Nov. 1984.
Recording Music on Floppy Discs, A. Zuckerman, High Technology, May 1984.
Digital Recording System Uses floppy–discs, Audio Times, May 1984.
Brochure, Compusonics Corp.
Hi–Fi Floppy, Cades, P.C. World, Apr. 1985.
New Hi–Fi Horizons, D. Canada, Stereo Review, Dec. 1984.
Specs. And Implem.of computer Audio console for Digital Mixing and Recording, D. Schwartz, AES 76th Convention, NYC, Jun. 20, 1984.
A High Speed Telecommunications Interface for Digital Audio Transmission and Reception, H. H. Sohn, Compusonics Corp.
The Audio Computer and its applications, Schwartz & Stautner, Compusonics Corp.
Engineering Your Own Digital Audio Broadcast System, D. Schwartz, Compusonics Corp.
Memo: To Mr. Kapp; from D. Schwartz, D. Schwartz, CompuSonics Corp., Apr. 26, 1990.
CompuSonics DSP 2002—Preliminary User Manual, CES, Jun. 1984.
Digital Mark. Corp. Video Real Estate System, JPS, CompuSonics Corporation.
Memo: to Holmbraker et al., D. Schwartz, CompuSonics Corporation.

Assembly Procedure for DS 1500, CompuSonics Corporation.
Application Notes: CSX Digital Signaling Processing, CompuSonics Corporation.
DMS Lecture, Compusonics Corporation, 1991.
Application Notes: DSP 1000 Digital Audio Disc Recorder, Compusonics Corporation.
Letter to E. Kraeutler, Esq. Re: CDNews/Liquid Auto, I. Gross, Wilson, Sonsini, Goodrich and Rosati—Apr. 14, 2000.
Patent License Agreement, Schoen & Hooban, Ergon Technology Associates Corp.
The Home Terminal, IRD, Inc., Aug. 1978.
Rolm Plugs CBX Into, EMMS—May 2, 1983.
Employee Non–Competition Agreement, CDNow, Inc.
Letter to D. Berl, Esq., K.J. Choi, Lucent Technologies.
Video Explosion on the way for buyers, M. Galligan, US News and World Report, Jun. 18, 1984.
Hi–Fi in the '80's: Not only Alive and Well . . . , L. Feldman, Information Access Co., Jul. 1984.
The Search for the Digital Recorder, B. Dumaine, Time, Inc., Nov. 12, 1984.
Ultimate Integration: Putting Software theory into . . . , J. Balga, Information Access Co., Feb. 12, 1985.
Technology Review, R. Welch, The American Banker, Dec. 12, 1986.
Remembering the Gameline, D. Skelton, www.mindspring.com.
Gameline Module links with game bank, D. Burns, www.atarimagazines.com.
Allison 7 Video, Allison, EE 380 Feb. 18, 1987.
Telesoftware—Value Added Teletext, J. Hedger, IEEE Transactions on Consumer Electronics; Feb.1980, vol. CE–26.
Telesoftware: Home Computing Via Broadcast Teletext, J. Hedger, IEEE Transactions on Consumer Electronics; Jul. 1999, vol. CE–25, No. 3.
The Future of Television as The Home Communications Terminal, International Resource Development Inc., Aug. 1981 (CDN 23101–23109).
Videogames & Electronic Toys, note, International Resource Development, Inc May 1983 (CDN 023054).
Telepay vs. Videodisc, International Resource Development Inc., Sep. 1982 (CDN 023068).
Health, Wealth & Self–Improvement Home Software, International Resource Development Inc., Sep. 1985 (CDN 023091).
Telecommunications Market Opportunities, International Resource Development Inc., Nov. 1985 (CDN 023110–023138.
VideoPrint (Contents), Jun. 22, 1983 (CDN 023139–23142).
CompSonics/Carts, Sep. 9, 1985 (CDN 023143).
Current Samples (Compusonics Digitizes Phone Lines), Sep. 1985 (CDN 023144).
(BME) Station Automation (New Telerecording Method for Audio, Oct. 1985 (CDN 023145–23146).
High–Tech do–Dads for the man of the house (Sound Investments), (CDN 023147–23150).
New Software (Delivery over the phone), Telephone Software Connection Inc. Oct., 1982 (CDN 023151).
Communications (No time to shop for software), Jessica Paioff, Aug. 20, 1984 (CDN023152).
Warner Amex QUBE Cable Communications, Peggy Conger, (CDN 023153–023157).
Warner Amex QUBE Cable Communications (Articles), (CDN 023158).
QUBE–ists (Where is everyone now?), (CDN 023159–23160).
The Shyvers Multiphone, (CDN023161–23162).
Dead medium: Telephonic Jukeboxes: The Shyvers Multiphone (Multiphone), (CDN 023163–23166).
Jukebox History 1934–1951, (CDN 023167–23173).
New Music Box (Keyboard and Tactile Interfaces), Oct. 1999 (CDN 023174–23180).
Britannica.com (telharmonium), (CDN 023181).
Book Review (Magic Music from the Telharmonium), Paul Hertz, The Scarecrow Press, Inc., (CDN 023182).
Thaddeus Cahill (Dynamophone/Telharmonium) 1897, (CDN 023183–23186).
Thaddeus Cahill and the Telharmonium (electric instrument), (CDN 023187–23189).
Style (The Latest Technology), Richard Harrington, Jun. 28, 1981 (CDN 023190–23191).
Financial, Oct. 13, 1981 (Tuesday) (CDN 023192).
Labels Gear Up For "Home Music Store", Earl Paige Ken Terry Bill Holland, Apr. 6, 1991 (CDN 023193–23194).
Abstract (Home Music Store), Laura Landro, Oct. 14, 1981 (Wednesday) (CDN 023195).
Washington Business (Music From the Skies Promised By Firm Serving Cable Users), Scott Chase, Oct. 19, 1981 (Monday) (CDN 023196).
Arts and Leisure Desk (Sounds: The Record Shop Of The Future May In Your Parlor), Hans Fantel, Nov. 22, 1981 (Sunday) (CDN 023197–23199).
Media & Advertising (What is stalling the record business), Nov. 30, 1981. (Industrial Edition) (CDN 023200–23202).
Financial Desk (Cable TV Moves to the Music, Andrew L. Yarrow, Jul. 4, 1982 (L. City Final Edition) (CDN 023203–23204.
TSC Write–Ups, (CDN 023552).
Telphone Software Connection, Inc. (The Hayes Micromodem II), (CDN 023553–23554.
TSC Bibliography (Call–Apple), (CDN 023556–23567).
Computers (Telephone Software Connection), (CDN 023559).
Article References (Now Your Home), Popular Mechanics, Mar. 1981. (CDN 023555–23568).
Buyers Guide (Branch Centers), (CDN 023569–23570).
News Link (Software delivery now at 2400 baud), Dec. 1985. (CDN 023571).
Telephone Software Connection, (CDN 023572–23573).
Software (Online Tip), (CDN 023574).
Telecommunicating (PC–Talk.III), (CDN 023575).
Poll (Adults believe children know more about computers), Lawrence Kilman, Oct. 16, 1985 (CDN 023576).
Electronic Mall (Telephone Software Connection), (CDN 023577).
Data Communications (Protecting Your Network Data), Elisabeth Horwitt, (CDN 023578).
To Catch A Thief (Microcomputer), Jul. 1985. (CDN 023579–23583).
Caller Response (Services) (Shopping for software at home, by phone), (CDN 023584).
On Line Consulting (Planning, Programming & Training), (CDN 023585).
Entry (Entry goes on line!), (CDN 023586).
Unique (2000 New Articles Screened Each Day), (CDN 023587).

Entry (Entry Magazine), (CDN 023588).
Satin and lace, and a message base (A board is a board), Dru Simon, (CDN 023589).
Reflections (on the videotex industry), Carole Houze Gerber, (CDN 023590).
Software Online (Help for Disabled Computer Users), (CDN 023591).
Telescan Analyzer & Telescan Database, Dec. 1984. (CDN 023592).
Reader Service (Phone secretary II), Dec. 1984. (CDN 023593–23595).
Communications Software (Software Communications Inc.), Nov. 1984 (CDN 023596–023601).
Communications (No time to shop for software?), Jessica Paioff, Aug. 20, 1984 (023602).
Link (Telephone Software), May 1984. (CDN 023603–23621).
Sample of Available Graphics Programs (Manufacturer), Oct. 1984 (CDN 023607).
RAM Required, Oct. 1984 (CDN 023608).
Telecommunicating, Art Kleiner, Spring 1984, (CDN 023610–23611).
Whole Earth Recommended Telecommunication Tools (Terminal Programs), Feb. 1984 (CDN 023612–23613).
Mite (Finding Mite), Spring 1984 (CDN 023614–23618).
Electronic Mail Programs (MCI Mail), Spring 1984 (CDN 023619).
Computer Conferencing Systems ( CompuServe Special Interest Groups (SIGs), Spring 1984 (CDN 023620).
Uncorrected Page Proof (How RO Get Free Software), Alfred Glossbrenner, (CDN 023622).
The Treasure Trove (Comments;Diversi–DOS), DSR,Inc (CDN 023623–23630).
In Search of the Consummate Time Manager (Effective Management), Margaret P. Ezell, (CDN 023631–23632).
Display (meet, report,sell, plan), (CDN 023633).
Turning Point (Time is Money), (CDN 023634).
Lection, May 1984 (CDN 023635–23636).
Getting on Communi (Proveders and Consumers), Ed Magnin, Telephone Software Connection, Inc. Mar. 1984 (CDN 023637–23638).
Telecommunications (A Software Vending Machine), Ed Magnin, Telephone Software Connection, Inc. Mar. 1984 (CDN 023639).
Telecommunications (Auto Modem), Michael J. O'Neil, Mar. 1984 (CDN023640).
Micro Software Distribution (Now,Software Is Distributed By Wire, Ronald R. Cooke, Nov. 1983 (CDN 023642).
References: Offices and Numbers. 1984 (CDN 023643–23660).
Softalk (SubLogic), Dec. 1983 (CDN 023661–23676).
The TRS Connection, Nov. 1983 9CDN 023677–023679).
Display (The Access Unlimited Micro Shoping Center), Nov. 1983 (CDN 023680).
Telecommunications (Telecommunications Adviser), Ed Magnin, Telephone Software Connection Inc. Nov. 1983 (CDN 023681–23682).
Communications (Special Delivery Software), Lisa B. Stahr, Oct. 1983 (CDN 023683–23686).
Plumb (Employment Want Ads Go Online), Jun. 1983 (CDN 23688–23695).
Apple's New Image, (CDN 023696).
Tech (Lisa And Software Writers—No Love At First Byte?), Jessica Schwartz, (CDN 023697–23698).
Display (Datamost), (CDN 023699).
Cider (What's New This Month), Jun. 1983 (CDN 023700–23701).
Display (2nd Generation Spreadsheet), (CDN 023702).
Telecommunications (Telecommunications Adviser), Ed Magnin, Telephone Software Connection Inc. Jun. 1983 (CDN 023703–23704).
Cider Book Shelf, Jun. 1983 (CDN 023705–23706).
Telecommunications (Telecommunications Adviser) "Acoustic", Ed Magnin, Telephone Software Connection Inc. Jun. 1983 (CDN 023707–23709).
Downloader's Supermarket, Jun. 1983 (CDN 023710).
Letters (Krell Responds to review of LOGO), (CDN 023711).
Display (Apple Orchard ) Peelings II responds. Nov. 2, 1983 (CDN 023712–23713).
Display (Nibble is Terrific), (CDN 023714).
Technology (Electronic Software Delivery Threatens Mail And Store Sales), William M. Bulkeley, Apr. 11, 1983 (CDN 023716–23717) The Wall Street Journal.
ET Phones Office (Electronic Transfer), Apr. 1983 (CDN 023718–23721) The Digest.
Western Union's Easylink Gets Direct Telex–To–PC Connection, Mar. 21, 1983 (CDN 023722)Information System News.
The Book Of Software, 1983 (CDN 02723–23725).
Softalk Classified Advertising (The Predictor), Apr. 1983 (CDN023726–23729 Softalk.
Programs boogie with–o–tech (Sales styles and marking strategies: A hard look at software), Joanne Cleaver, (CDN023730–23731) Home Computer.
Marketing Moves (Information services move modems), Deborah de Peyster, Mar. 7, 1983 (CDN 023733) ISO World.
Computer–Based Business Files (Available file transfer software), Mar./Apr. 1983 (CDN 023734–23735).
Chapter II Using Your Thunderclock Plus (Applications Software Packages Supporting the Thunderlock Plus), (CDN 023736).
Thunderclock Plus (User's Guide), (CDN 023737).
Pinball wizardry's gone electronic (the home computer), Duane Sandul, (CDN 023738).
Programmed to trim that waistline (the home computer), Duane Sandul, Feb. 5, 1983 (CDN 023739).
High adventure (the home computer), Duane Sandul, (CDN 023740).
Variation on a Theme, Dec. 1982 (CDN 023742).
Programmers Library, Paul Leighton, Dec. 1982 (CDN 023743–23744).
The Arcade Machine (Introduction), Chris Jochumson Doug Carlston, (CDN 023745).
Telephone Transfer II (Introduction), Leifhton Paul Ed Magnin, Nov. 1982 (CDN 023746).
Printographer (Introduction), Stephen Billard (CDN023747).
Connecting Your Computer to a Modem: Where to Start, Bill Chalgren (CDN 023748–23756).
L.I.S.A. (Laser Systems Interactive Sybolic Assembler) V. 1.5, (CDN 023757–23758).
Recent Computer Science Books, (CDN 023759–23763).
Modifying Your Monitor Program, Leighton Paul, (CDN023764–23765).
Modems: Hooking your Computer to the World, Stan Miastkowski George Stewart, Dec. 1982 (CDN 023766–23772).

Business (Telephone Software Connection), Dec. 1982 (CDN 023774–23787.
Displays (COOSOL Computer Products), Dec. 1982 (CDN 023788).
Displays: Apple (Amper–Magic), Dec. 1982 (CDN 023789).
Tomorrow's Apples Today (Telephone Transfer II), Nov. 1982 (CDN 023790–23792).
Display: (Music Maker Etc.), (CDN 023793).
A Guide to Communication Software Packages (Cutting line cost), Oct. 1982 CDN 023794–23807).
Data Communication Professionals:(Engineering Department Manager–Software, Oct. 1982 (CDN 023808).
Modems and the Micromodem II, Athol H. Cohen, (CDN 023809–23818.
Software (Arcade Math), Sep./Oct. 1982 (CDN 023819–23821).
Marketing (Makers Transform the Ways Computer Programs Are Sold), Susan Chace, Aug. 26, 1982 (CDN 023822).
Letter Perfect Data Perfect Edit 6502 (Letter Perfect), (CDN023823–23826).
Patching DOS The Easy Way, Leighton Paul, (CDN 023827).
Display: Together,Locksmith, the Inspector and Watson, (CDN 023828).
Electronic Mail System Enhances Delphi Method, Bernard S. Husbands, 1982 (CDN 023829–23832).
New Products (Save Civilization in Your Spare Time), May 1982 (CDN 023833–23843).
Just a Call Away (Dial Up Software Service), (CDN 023844).
Display: Radio & Records, (CDN 023845).
Display: She's No Stranger Now, (CDN 023846).
Radio & Records: Letter to Ed Magnin, Pam Bellamy, Apr. 22, 1982 (CDN 023847).
How to buy a personal computer (Here We Go Again), (CDN 023849–23850).
What's New? (Overlay Compller, Mar. 1982 (CDN 023851–23852).
Display: Pure Power, Feb. 1982 (CDN 023854).
New Products: Not Just Another Chess Game (Championship chess), Feb. 1982 (CDN 023855).
New Electronic Mail Service On–Line, (CDN 023856).
Display: Arithmetic Teacher (Problems for Solving Fractions), (CDN 023857).
A Guide to Personal Computers (Personal–Computer Hardware), Steve Ditlea, Dec. 14, 1981 CDN 02386223870) New York.
A Line on Friendly Utilities, Theron Fuller, (CDN 023871–23874).
Conferences Goes On–Line (Ethernet Online), (CDN 023875–23881).
Terminal Data, Jeffrey Mazur, Sep. 1981 (CDN 023882–23885).
Dataloop: Smartmodem announced at NCC '81, Jul. 2, 1981 (CDN 023886–23893).
Research: George Bond, Jul. 7, 1981 (CDN 023894–23896).
Market Charter, Jun. 1981 (CDN 023897–23901).
Telephone Software Connectin (Phone Log), Feb. 1981 (CDN 023902).
Display: Faster Than a Speeding Typist, (CDN 023903).
Marketalk News (Multi–Media Video), Jan. 1981 (CDN 023904–23905).
Dial–Yo Directory (Talking Terminals, Frank J. Derfler, Jr., Jan. 1981 (CDN 023906–23907).
Apple Cart (Books), Chuck Carpenter, (CDN 023908–23910).
Display: Space War and Invasion, (CDN 023911).
Marketalk News (Hardhat Software), Nov. 1980 (CDN 023912–23913).
Admin.:Hello CBS News (Letter to Ed), (CDN 023915–23916).
Display: Advanced Electronics, (CDN 023918).
Novation Premieres New Exhibit at Two Los Angeles Shows, (CDN 023919–23923).
Microprocessor Newsletter: Microprocessor Training Center, Jun. 5, 1980 (CDN 023924–23932).
The Telephone Software Experience a Review (of Sorts), Val J. Golding, May 1980 (CDN 023933–23935).
Bibliography (hand notes), (CDN 023917–23732).
Display;Our Records of Growth, May 1979 (CDN 023937).
Display: Purchase and Receive Software, (CDN 023953).
Letter from License Department to Edgar&Marilyn Magnin, Jul. 19, 1979 (CDN 023938).
Copy of Business License (Business License Application), Edgar & Marilyn Magnin, (CDN 023939–23940).
Letter from J. Walker Owens Re: New Business Operator (Welcome), J. Walker Owens, Aug. 9, 1979 (CDN 023941–23944).
Software for the Apple II (Dynamaze,Ultra Blockade) Games), (CDN 023945–23946).
Display: Telephone Software Connection (Many Thanks for Your Recent Order), (CDN 023947).
Price Log (Answering Machines, Write–Edit&Send), (CDN 023951–23952).
Display: Advertisement (Desk Calculator II), Jul. 1980 (CDN 023950).
Instructions: Computer with header, (CDN 023954).
Microsoft Consumer Products Continuing the Microsoft Tradition (Announcing Microsoft Consumer Products), (CDN 023955).
The Apple Orchard (Computer World Printer INIT Routine), Mar./Apr. 1980 (CDN 023956).
Volume Table of Contents ($11,0), Jul./Aug. 1980 (CDN 023957–23959).
Sup'r'Terminal (Specifications), (CDN 023960).
Call–Apple (functions, remin.), Mar./Apr. 1980 (CDN 023961).
Call–Apple (Stock Market Data Retrieval One the Source), Hersch Pilloff, Mar./Apr. 1980 (CDN 023962).
CBS News Crew From Walter Cronkite, David Dow, Sep 9, 1980 (CDN 023963–23965).
Telephone Software Connection (Phone Log), (CDN 023966–23969).
Advertising for quicker shopping over computer (Go–Moku), (CDN 023970–23971).
Advertising for Pet and Apple II Users (PASCAL), Nov./Dec. 1980 (CDN 023973).
Letter from Telephone software Connection (Regarding the Electronic Communication Service), Mar. (CDN 023977).
Letter (Offering Introduction), (CDN 023979–23983).
Letter from Ed Magnin Ref: TSC/Telemail User), Ed Magnin, Feb. 8, 1982 (CDN 023984).
Now Your Home Computer Can Call Other Computers One the Telephone, Neil Shapiro, Mar. 1981 (CDN 023985–23987).

Advertising (Shape Builder, Terminal Programs, Double DOS, Math Tutor), Mar. 1981 (CDN 023988–23990).
Softalk (Micromate's Micronet—It Plugs in the Game Port), May (CDN 023991).
Voided Blank Check #1513, May (CDN 023998).
Corvus Controlling 3 Apples (We Have New Phone Numbers), May 18, 1981 (CDN 023999).
Predicting the Future With Electronic Mail (The Telenet Way), Bernard S. Husbands, Oct. 1981 (CDN 024000–24001).
Program Shopping by Phone: Software Co. Downloads Programs, Michael Swaine, Oct. 19, 1981 (CDN 024002).
Telephone Software Connection, Inc. (The Hayes Micromodem II: I've Never Brought a Better Slave, Jul. 1981 (CDN 024003).
Advertising (Shape Builder), CDN 024006–24008).
Advertising (Telephone Transfer II), (CDN 024009).
Display: The FP Report, (CDN 024018) Telephone Software Connection, Inc.
Display: Order Via Modem, (CDN 024019).
Price Log, Jun. 2, 1982 (CDN 02492023422).
Price Log Cont.), Oct. 21, 1982 (CDN 024023).
Display: Telephone Software Connection (Address Postage), (CDN 024024–24025).
Telephone Software Connection (Letter to Apple Dealer), Ed Magnin , (CDN 024026).
Display (Mr. Smartypants), (CDN 024028–24030).
Display (Disk–Cryption), (CDN 024031–24032).
Display (Video Librarian, (CDN 024033–24035).
Display (World Currency Trader), (CDN 024036–24037).
Display (Working Model of Telephone Software), (CDN 024038).
Telephone Software Connection (Letter to AppleCat Owner), Ed Magnin, (CDN 024039–24040).
Telephone Software Connection : The Hayes Micromodem II (I've never bought better slave), May 1980 (CDN 024041–24042).
Special Memo to Educators, Ed Magnin, (CDN 024043–24044).
Telephone Software Connection (Backgroung Piece, (CDN 024045–24049).
Display: Vend–O–Disk, (CDN 024050–24052).
Letter to Programmer, Ed Magnin, (CDN 024053–24054).
News From T.S.C., Apr. 1983 (CDN 024055–24058).
News From T.S.C., Jun. 1983 (CDN 024059–24062).
What is Voicemail?, (CDN 024063–24065).
Telephone Software Connection (Introduction), Ed Magnin, (CDN 024066–24067).
News From T.S.C., Oct. 1983 (CDN 024068–240710.
How to Order: Modem, 024072–24077).
Telecommunication (Teledelivery), (CDN 024084).
News From T.S.C., Jun. 1984, (CDN 024085–24088).
PlumbLine (Base Computers), (CDN 024089–24090).
News From T.S.C., Dec. 1984 (CDN 024091–24094).
News From T.S.C., Mar. 1985 (CDN 024095–24098).
Display: Phone Secretary, (CDN 024099–24100).
Telephone Software Connection (Background Pieces), (CDN 024101–24106).
Telephone Software Connection (Top Secret) Displays, (CDN 02410724113).
Display (Before 1984), (CDN 024114).
Display: If You Have an Apple (phone list), (CDN 024115–24117).
Display (The FP Report), (CDN 024118–24119).
The Haye's Micromodem II, CDN 024120–24121).
Price Log, (CDN 024122–24123).
News From T.S.C., Oct. 1983 (CDN 024124).
Display: Instructions on Software Delevery), (CDN 024125).
Price Log, (CDN 024126–24127).
News From T.S.C., Jun. 1983 (CDN 024128–24129).
Price Log, (CDN 024130–24131).
News From T.S.C., (CDN 024132–24133).
Display (Phone Secretary II (54), CDN 024134).
Letter to Programmer, Ed Magnin, (CDN 024135).
Programmers' Pipeline (Description Slip), (CDN 024136–24137).
Display: World Currency Trader, (CDN 024138).
Price Log, (CDN 024139–24140).
Display: Order Via Modem, (CDN 024141).
Display: Six Great Ways to Add to Your Summer Fun!, CDN 024142).
Phone Log, (CDN 024143–24144).
News From T.S.C. (Recent Offerings), Mar. 1985 (CDN 024145).
Spotlight on Graphics (Shape Builder), CDN 024146–24148).
Disk. Labelmaker (#73), CDN 024149).
News From T.S.C. (Terninal Program II), (CDN 024150–24152).
Free Update to Desk Calendar II, (CDN 024153).
News From T.S.C., Jun. 1984 (CDN 024154–24156).
Display: (Disk–Cryption), (CDN 024157–24158).
Display: (Phone Secretary) (#54), (CDN 024159–24160).
Communication (Terminal Program), (CDN 024161–24168).
Dialing Instructions, (CDN 024169).
Telecommunications Adviser, Ed Magnin, Nov. 1983 (CDN 024170–24171).
Getting On Communi (Providers and Consumers), Ed Magnin, Mar. 1983 (CDN 021417224173).
Online Tips, (CDN 024174).
Display: List (Software Sales), Apr. 11, 1983 (CDN 024175).
A Software Vending Machine, Ed Magnin, Mar. 1984 (CDN 024176).
Marketing (Makers Transform the Ways Computer Programs Are Sold), Susan Chace, Aug. 26, 1982 (CDN 024177) The Wall Street Journal.
Technology (Electronic Software Delivery Threatens Mail and Store Sales), May 6, 1983 (CDN 024178).
Western Union: Mailgram (Letter to Microcomputer User), (CDN 024179).
Apple//c Baud Rate Problem (Dialing Instructions), (CDN 024180).
Display: Recent Offerings, Mar. 1985 (CDN 024181–24184).
Letter ti Prometheus Modem Owner, Ed Magnin, (CDN 024185).
Display: Phone Secretary// (54), (CDN 024186–24187).
Future Developments in Telecommunication, (CDN 024188).
Responses (Future Developments in Telecommunication), (CDN 024189).
Charts (Uses for Telecommunication Links), (CDN 024190–24192).
Prologue (The Communication Satellite), (CDN 024193–24194).

Analog Versus Digital Transmission, (CDN 024195–24206).
Cable Television and Its Potential, (CDN 024207–24209).
Display: Qube gets you into the action, (CDN 024210).
Terminals in the Home, (CDN 024211–24223).
A Future Scenario, (CDN 024224–24246).
Signal Compression, (CDN 024247–24261).
Letter from Ed Magnin (Monthly Rental), Ed Magnin, (CDN 024262–24264).
Jitters, Jul. 29, 1996 (CDN 024265) Business Week.
E–Commerce: Who Owns the Rights?, Jul. 29, 1996 (CDN 02466–24267).
A pilot has to believe in his equipment. (Rolex), (CDN 024268).
Retailers cheer end of patent challenge, Dan Goodin, Apr. 2, 1999 (CDN 024269–24271).
Patently Offensive, Shoshana Berger, (CDN 024272).
Magnin & Associates (Video Game, Film & TV), (CDN 024273–24274).
Documents (Appendix F: Decimal Tokens for Keywords), (CDN 024275–24276).
Appendix F: Decimal Tokens For Key words, (CDN 024277).
Private People (Easing the way for libel suits), (CDN 024278).
May the Source Be With You, Christopher Bryon, (CDN 024279).
Information Services: Modems, (CDN 024280).
A Source of Riches, Alfred Glossbrenner, Aug. 1983 (CDN 024281–24284).
Electronic Jackpot, Alfred Grossbrenner, Sep. 1983 (CDN 024285–24287).
Consumer and Specialized On–Line Services, (CDN 024288–24290).
Calculation Programs, (CDN 024291–24293).
What Is Viewdata, CDN 024294–24302).
PM Electronics Monitor, Neil Shapiro, (CDN 024303).
Dial–Up Software Networks, Jules H. Gilder, May 1980 (CDN 024304–24306).
Software and Data Via Telephone, Oct. 1980 (CDN 024307–24310).
Dial–Up Software Networks, Herb Friedman, Oct. 1992 (024311–24314).
Documents (Ticketmaster to Lick Competition by Buying It), (CDN 024315–24316).
Ticketmaster (memo), Alan Citron Michael Cieply, Feb. 26, 1991 (CDN 024317–24318) Los Angeles Times.
Ticketmaster: 20 Years (Industry's #1 Has a Ticket to Rule), Adam Sandler, (CDN 024319–24321).
Electronic Life, Michael Crichto, 1983 (CDN 024322).
The Naked Computer (Telesoftware ?), Rochester, Gantz, William Marrow + Co., (CDN 024323).
Computers for Everybody (Downloading Programs), Jerry Willis, 1984 (CDN 024324–24328).
Telecommunications in the Information Age (Videotext Chapter 12), Singleton, 1983 (CDN 024329–24340).
United States Patent (Lockwood), May 3, 1994 (CDN 024341–24343).
United States Patent (Yuris, et al.), Jan. 27, 1981 (CDN 024344).
United States Patent (Kelly, et al.), May 15, 1984 (CDN 024345).
United States Patent (Hellman), Apr. 14, 1987 (CDN 024346–24347).
Documents (The Wired Society), James Martin, (CDN 02434824349).
New Use of Television (Viewdata), (CDN 024350).
News (Do–It–Yourself Newspapers), (CDN 024351).
Spider Webs (Pierre Teilhard de Chardin, (CDN 024352–24353).
Instant Mail (Digitized Messages), (CDN 024354).
Information Deluge, (CDN 024355).
Satellite Age (Chapter Fourteen Home), CDN 024356–24366).
James Martin & Co. Executive Profiles (James Martin, Oct. 25, 1996 (CDN 024367–24368 ) JM & Co.
2. News (Dow Jones News/ Retrieval's Free–Text Search), 1985 (CDN 024369–24383).
Computers (Telesun), (CDN 024384–24387).
16 Full–Service (The Source), (CDN 024388–24408).
Article 49 of 88 PatNews : Another reason why the E–Data patent is invalid, Gregory Atharonian, Oct. 16, 1996 (CDN 024409–24410) Deja News.
Article 1 of 25 PatNews: Mor PTO gossip on Zache,Edata, Hyatt, Gregory Atharonian, Oct. 18, 1996 (CDN 024411–24412).
Display: TSC Review, (CDN 024413).
United States Postal Service (Documents & Letters), (CDN 024414–24423).
The Home Accountant, Revisited (Responds to reviews), (CDN 024424–24426).
DFX (Introductions), Graeme Scott, (CDN 024427–24442).
Peelings Review (Introductions), Nov. 12, 1982 (CDN 024443.
Pellings II (Programmers Library), Nov. 10, 1982 (CDN 02444–24454).
Letter (Trial Termial), K.F. Moseley, Mar. 10, 1981 (CDN 024455).
K.F. Moseley's TVInerface 8 Evaluation (Time and Money Meter, Ed Magnin, (CDN 024456–24457).
A.D.A.M. II Newsletter (Acknowledgement), May 13, 1981 (CDN 024458–24465).
Peelings II (Publication of Apple Software Reviews), Aug. 6, 1980 (CDN 024467–24500).
Apple–Cart (Input From Readers), Chuck Carpenter, (CDN 024501–24503) Creative Computing.
Call–Apple (The Telehpone Software Exprience a Reivew (of Sort), Val Golding, (CDN 024504).
Softalk (Peachy Writer), Sep. 1982 (CDN 024505).
Softalk (Preformer Printer Format Board), (CDN 024506).
Extra Copy RE: KM, (CDN 024507–24508).
Marketing (Makers Transform Ways Computer Programs Are Sold), Susan Chace, Aug. 26, 1982 (CDN 024509) The Wall Street Journal.
Marketing (Some Computer Junkies), Susan Chace, Aug. 26, 1982 (CDN 024510) The Wall Street Journal.
Extra (CDN 024511).
New Products ( Save Civilization in Your Spare Time), May 1982 (CDN 024512) Popular Computing.
Extra (CDN 024513).
What's New? (Overlay Compiler), March 1982 (CDN 024514).
The Information Directory Says It All! (Subject Index), (CDN 024515).
Tap New Markets! (Information Directory), (CDN 024516).
The 21st Century Library (Information Directory), Anne M. Helfrich, Mar. 16, 1982 (CDN 024517–24524).

Electronic Mail (Applications for Management), (CDN 024525–244534).
InfoWorld (AVL Eagle), Oct. 19, 1981.
TSC (Microcomputing), Oct. 15, 1981 CDN 024536).
Electronic Distribution (Trial Builder), (CDN 024537–24546).
Music (Honey. They're Downloading Our Song), Patrick M. Reilly, (CDN 024547–24548).
Who's News (Foundation Health Names Malik Hasan As CEO and President), May 13, 1997 (CDN 024549).
Industry Focus (Middlemen Find Ways to Survive Cyberspace Shopping), David Bank, (Dec. 12, 1996 (CDN 024550).
Egghead Inc. Ships Software Over Internet (Ingram Micro Inc.), David Bannk, Nov. 8, 1996 (CDN 024551).
Tom Clancy, Virtus Start Firm for On–Line Games, Nov. 13, 1996 (CDN 024552).
N2K Hires Phil Ramone to Start Up A Music Label Linked to the Internet, Patrick M. Reilly, Nov. 18, 1996 (CDN 024553) ).
Business Briefs (AT&T Unveils a Services to Help Businesses Set Up Shop on Internet), JamesSanberg, Oct. 9, 1996 (CDN 024554).
Technology & Health (Industry Net Customers to Be Offered On–Line Payment Services From PNC), Raju Narisetti, Sep. 25, 1996 (CDN024555).
Vague New World (Digital Media Business Takes Form as a Battle Of Complex Alliances) (CDN 024556–24558).
Music Firms Vow to Block New CD System, Meg Cox, May 14, 1993 (CDN 024559–24560).
Business (Blockbuster plans to stock CDs electronically, May 12, 1993 (CDN 024561).
Technology&Health (Bellcore to Demonstrate System For Delivering Movies By Phone, Mary Lu Carnevale, Nov. 9, 1992 (CDN 024562).
Technology (IBM Commits More Than $100 Million on Venture to Relay Video, Other Data), Michael W, Miller, Sep. 16, 1992 (CDN 024563–24564).
IBM to UnVeil Plan to Skip Disks, Send Software By Satellite (GM's Hughes Network Joins Big Blue Alliance to Serve Retailers and Corporations), Bart Ziegler, Nov. 1, 1994 (CDN 024565–24566).
Software Industry Bulletin (SIB Third Quarter 1985 Software Employment Survey), Oct. 14, 1985 (CDN 024567–24568).
Download (Vendors Kick Off Fall Season With Teledelivery Ventures, Sep. 1985 (CDN 024569–24583).
Speed>s (Electronic Delivery of Software), (CDN 024584–24595).
Phone Memo, Apr. 19, 1985 (CDN 024596–24600).
Letter to Nathaniel Forbes (MCI Mail Letter), Ed Magnin, Apr. 8, 1985 (CDN 024601–24607).
Speed>s (The Inside Story), Apr. 8, 1985 (CDN 024608–24623).
Document: Letter to Nathaniel Forbes (Express Mail), Ed Magnin, Mar. 29, 1985 (CDN 024624–24630).
Gimcrax, Inc (The leader in electronic delivery of software), Dec. 5, 1984 (CDN 024631–24636).
Speed>s (New Edition of Speed<s disk Now Available), (CDN 024637).
Speed>s (Postage), (CDN 024638).
Speed>s (Over 50 Lotus 1–2–3 templates to be available exclusively on Speed<s!, (CDN 024639).
Speed>s (Postage), (CDN 024640).

Speed>s (Open An Electronic Library for Your Company Software), (CDN 024641).
Speed>s (Postage), Jan. 27, 1986 (CDN 024642).
Gimcrax Launches File Delivery Service, Dec. 23, 1985 (CDN 24643).
Speed>s (What Modem Should I Buy), Nov. 22, 1985 (CDN 024644).
Display (Speed>s), Dec. 2, 1985 (CDN 024645).
Speed>s (Now! Try Speed<s Electronic Delivery!), Oct. 21, 1985 (CDN 024646).
Speed>s (Your First Issue on the Speed<s Password!), (CDN 024647).
International Videotex Teletext News (Gimcrax to Download), Aug. 1984 (CDN 024648).
Speed>s (Speed>s Mean Business), (CDN 024649–24652).
News From the Source (Nat Forbes Promoted to Director of Sales for STC), (CDN 024653–24654).
Speed>s (Speed>s Mean Business), (CDN 024655–24658).
Handwritten Notes, (CDN 024659–24665).
Handwritten Notes (Nat Forbes), Mar. 28, 1985 (CDN 24666–24668).
Net to Transmit Videotex, Games to 12 Million User, Jim Bartimo, Jun. 13, 1983 (CDN 024669) Computer World.
Vending machines for software: What will Japan think up next? (Games only), Jun. 1985 (CDN 024670) Data Communications.
Electronic Software Distributor To Show System to Retailers, Rory J. O'Connor, May 30, 1983 (CDN 024671).
Software Industry Bulletin (Electronic Software Distributors), (CDN 024672–24675).
Software (Why try to stock software like physical goods? Why not just reproduce it as needed), (CDN 0924676–24683).
Mr. Download: An Interview with William von Meister, (CDN 024684–24693).
Letter to Bob Peyser (Telephone Software Connections), Ed Magnin, Mar. 25, 1985 (CDN 02469424700).
Direct–Net (Micro Marketworld Readers), Bill James, Feb. 1, 1985 (CDN 024701–24702).
Cutting Out the Middleman (Looking to expand their customer base), Myron Berger, (CDN 024703–24708).
Shop by Modem (Software Without Manuals), (CDN 024709).
Speak the Universal Lanaguage (Powerhouse), (CDN 024710).
Letter to Ed Magnin (Software Author Royalty Agreement), Fonnie Clifton, Oct. 17, 1983 (CDN 024711–24733).
Buy Software Via Modem (Define the Need), Elizabeth Ferrarini, (CDN 024734–24745).
ABC Video Enterprises Telefirst Project Had Boosters & Doubters, May 1, 1984 (CDN 024746).
Download (Micropro & Adapso Sue American Brands, Allege Software Piracy), Feb. 1985 (CDN 024747–24762).
Coleco, AT&T Unit to Form Joint Venture To Distribute Video Games By Telephone, Bob Davis, (CDN 024763).
Electronic (Pulling the Plug on Electronic Publishing), (CDN 024764–24766).
Software (Software Directories Go On–Line, Joanne Gamlin (CDN 024767–24780).
Say It With Remote Rom Software Delivery (Looking Ahead With Software News), (CDN 024781).
It's Not The Same Old 'Help' Anymore (Buzz Word), Mary–Beth Santarelli, (CDN 024782).

Are You Getting Ready for Electronic Software Delivery?, Richard Lewis, Feb. 1984 (CDN 024783–24788).

Hammerly files suit against PC Telelmart, (CDN 024789).

Micro Software Today (Education: Entertainment), (CDN 024790).

Distribution & Retailing (Xante to Distribute Software Electronically to Mass Merchandisers), (CDN 024791).

Systems : Software Engineering (Letter from Phil Klamm), Phil Klamm, Jan. 20, 1984 (CDN 024792).

ROM–Labs (Electronic Software Distribution System), Jan. 3, 1984 (CDN 024793–24802).

Van Diver's (The Most Resourceful Directories for the IBM PC, (CDN 024803).

Software Distribution: Smooth Going Now : Rocky Road Ahead, Steve Burke, (CDN 024804).

Romox is hoping to have system in 3,000 stores by end of '84, (CDN 024805).

Display (Soft Touch), Jan. 12, 1984 (CDN 024806).

Bugs in Electronic Software Distribution Not Worked Out (Electronic Distribution), Lisa Raleigh, (CDN 024807–24809).

Announcing a New In–Depth Study and Analysis of (Downloading & Teledelivery of Computer Software, Music & Video), Nancy L. Stocker, Mar. 11, 1986 (CDN 024810–24824).

Certificate of Copy Registration (Time and Money Meter), Edgar J. Magnin, Mar. 8, 1982 (CDN 024825–24840).

Certificate of Copy Registration (Quick Clock Adjust), Edgar J. Magnin, (CDN 024841–24847).

Certificate of Copy Registration (Math Tutor), Edgar J. Magnin, Jul. 18, 1981 (CDN 024848–24864).

Document: Delivery Notice (Certified), (CDN 024865.

Document: Postal Receipt (Certified) From : Ed & Marilyn Magnin, Mar. 27, 1981 (CDN 024866).

Receipt for Certified Mail #288727, Mar. 6, 1981 (CDN 024867).

Instructions :Certified Mail Fee, Optional Services, (CDN 024868).

Letter from Edgar J. Magnin (Copyrights Registration: Terminal Programs, Edgar J. Magnin, Mar. 5, 1981 ( CDN 024869–24889).

Receipt (Register of Copyrights), Nov. 4, 1980 (CDN 024890–24905.

Receipt (Register of Copyrights: Library of Congress, Sep. 3, 1980 (CDN 024906–24927).

Certificate of Copyright Registration (Phone Secretary), Edgar J. Magnin, Nov. 4, 1980 (CDN 024929–24934).

Letter from Edgar J. Magnin (Copyright Registration: Phone Secretary), Edgar J. Magnin, Aug. 27, 1980 (CDN 024935–24946).

Letter from Edgar J. Magnin (Call TSC, Picture Transfer, Go–Moku, Chess Connection, Edgar J. Magnin, May 30, 1980 (CDN 024947–24951).

Certificate of Copyright Registration (Go–Moku), Edgar J. Magnin, Jun. 9, 1980 (CDN 024952–24960).

Certificate of Copyright Registration (Chess Connection), Craig Crossman, (CDN 024961–24971).

Certificate of Copyright Registration (Go–Moku), Edgar J. Magnin, (CDN 024972–24981).

Certificate of Copyright Registration (Call TSC), Edgar J. Magnin, (CDN 024982–24986).

Certificate of Copyright Registration (Picture Transfer Program), Edgar J. Magnin, (CDN 024987–25002) Apr. 1980.

Letter from Edgar J. Magnin :Applications for Copyright (Answering Machine, Write–Edit & Send, Telephone Transfer Program, Edgar J. Magnin, Mar. 28, 1980 (CDN 025003–25007).

Certificate of Copyright Registration (Write–Edit & Send, Edgar J. Magnin, (CDN 025008–25018).

Certificate of Copyright Registraction (Telephone Transfer Program), Edgar J. Magnin, (CDN 025019–25033).

Certificate of Copyright Registration (Answering Machine), Edgar J. Magnin, (CDN 025035–25046).

Certified Receipts: Certificate of Copyright Registration (Telephone Transfer II, Leighton Paul, Oct. (CDN 025047–25095).

Certificate of Copyright Registration (Telegammon), Anton Dahbura, Jr., (CDN 025096–25139).

Letter to Mr. Ledbetter RE: Correspondence of Mar. 12, 1982 control #2–054–0414(M), Edgar J. Magnin, Oct. 4, 1982 (CDN 025140–25212).

Certificate of Copyright Registration (Phone Secretary II), Edgar J. Magnin, Sep. 6, 1983 (CDN 025213–25253).

Certificate of Copyright Registration (Fifteen. Puzzle), Edgar J. Magnin, 7,1985 (CDN 025254–25313).

Letter to Mr. Magnin: RE: Fraction Tutor (TX 1 384 355) sand Typing Speed Builder (Certificate of Copyright Registration (Fraction Tutor), Edgar J. Magnin Larry M. Schultz, Jan. 4, 1985 (CDN 025314–25344).

Receipt for Certified Mail (Certificate of Copyright Registration (Picture Puzzle Programs), Edgar J. Magnin, (CDN 25345–25380).

Certificate of Copyright Registration (Quick Compare), Leighton Paul, (CDN 025381–25405.

Telephone Software Connection, Inc. (Program Listing), (CDN 025406–25408).

Serial Listing, (CDN 025409).

Serial Listing (con't), (CDN 025410).

Copyright Status (Programs,Copyright Notice Etc.), (CDN 02541125412731.

Receipts for Certified Mail : Letter from Edgar J. Magnin to Register of Copyrights (Instant Menu) Certified of Copyright Registration, Edgar J. Magnin, (Jun. 6/11, 1985 (CDN 025413–25448).

Receipts for Certified Mail: Letter from Edgar J. Magnin toRegister of Coping (Certified of Copyright Registration) : Mortgage Analyzer, Edgar J. Magnin, (CDN 025449–25475).

CompuSonics Version 1.05 (The Drive Event Control Loop for the DSP–1000), Jul. 17, 1987 (CDN 025476–255545).

Documents ( Routing for the Machine, Routines Required to Read and to the Front Panes), Mar. 11, 1987 (CDN 025546–25667).

CompuSonics D S P 2002 version 1.00 (Preliminary User Manual, Aug 28, 1985 (CDN 025668–25707.

Audio Computer Owners Guide (Advertising), (CDN 025708).

Quick Reference Card (Operations), (CDN 025709–25767).

An Algorithm and Architecture for Constant–Q Spectrum Analysis (Abstract), Gary W. Schwede, Apr. 1983 (CDN 025768–25771).

AES (Presented at the 76th Convention Oct. 8–11, 1984 New York, (CDN 025772–025775.

Command and Status Registers (Receive Data Count Register), (CDN 025776–25786).

Letter to David M. Schwartz (RE: The Preprints From the AES 78th Convention), Patricia M. Maclonald, Nov. 18, 1985 (CDN 25787–25817.
Efficient Data Reduction for Digital Audio Using a Digital Filter Array (Purpose), John P. Stautner David M. Horowitz, 1986 (CDN 025818–25821).
AES (Presented at the 83rd Convention Oct. 16–19, 1987 New York), David M. Schwartz, (CDN 025822–25829).
AES (Presented at the 83rd Conventin Oct. 16–19, 1987 New York, John Stautner Sriram Jayasimba, (CDN 025830–25836).
AES (Presented at the 84th Convention Mar. 1–4, 1988 Paris, J.P. Stautner, (CDN 025837–25854).
The Digital Audio Cartridge Disk Recorder, Reproducer and Editor for Broadcast Use, David M. Schwartz, (CDN 025855–25866).
Towards Electronic Delivery of Music(1.0 Introduction, John P. Stautner, (CDN 025867–25873).
Architecture of a Real Time Digital Filterbank Processor for Tempered, Auditory, and Critical–Band Analysis/Synthesis, Gary W. Schwede, (CDN 025874–25875).
A Functional Overview of the Compusonics DSP–2000 Series, (CDN 025876–25877).
Musical Recording, Editing and Production Using the Compusonics DSP–2004, John P. Stautner, (CDN 025878–258790).
Strategies for the Representation and Data Reduction of Digital Music Signals (Work Performed and Methods Employed), John P. Stautner, Jun. 20, 1984 (CDN 025880–25881.
Analysis and Synthesis of Music Using the Auditory Transform, J. Stautner, Submitted to Dept. of Electrical Engineering and Computer Science, Massachusetts Institute of Technology May 1983 CDN025895.
Algorithms and Architectures for Constant–Q Fourier Spectrum Analysis, G. Schwede, Dissertation submitted to University of California, Berkeley Nov. 28, 1983 CDN026097.
Letter to Shareholders, D. Schwartz, CompuSonics CDN026261.
From the News Desk, Info World Newsweekly, Jun 4, 1984 vol. 6, Issue 23 CDN026263.
Manufacturing Update, International Audio Video, Jun. 1984 CDN026264.
Compusonics Pro Equipment & Services, Cover of Billboard Newspaper CDN026265.
Compusonics Fuses Computer, Audio Into "World's First" Home Digital Recorder, M. Golden, CES Trade News Daily, p. 10 Jun. 4, 1984 CDN026266.
Digital Sound Now On Computer Disks, S. Booth, Consumer Electronics Show Daily Jun. 3, 1984 CDN026267.
CompuSonics Readies Floppy Disk to Record and Play Back Music, HFD—The Weekly Home Furnishings Newspaper Jun. 4, 1984 CDN026268.
Technology Awards to CompuSonics, CDN026269.
CompuSonics DSP 1000 Digital Audio Disk Recorder Specifications, CompuSonics Corporation CDN026270.
CompuSonic Bows Totally Digital, Pro Sound News, New York, NY Jun. 8, 1984.
Floppy Disks May Be the Next Music Makers, Business Week May 28, 1984 CDN026272.
Studio Design Special, Mix—The Recording Industry Magazine Aug. 1984.
CompuSonics: Another Digital Audio Standard, N. Weinstock, Mix, vol. 8, No. 8, p. 24 CDN026274.

CompuSonics: Another Digital Audio Standard, N. Weinstock, Mix, vol. 8, No. 8, p. 26 CDN026275.
CompuSonics Readies Floppy Disk to Record and Play Back Music, HFD, Electronics, Section 1 Jun. 4, 1984 CDN026276.
The State of RCA, TV Digest, p. 14 May 21, 1984 CDN026277.
Display—CompuSonics Photographs, CDN026278.
Display—CES Exhibition Design and Engineering 1984, CDN026280.
Specifications—CompuSonics DSP 1000 Digital Disk Recorder/Player, CompuSonics Corporation CDN026281.
Article—Watch Out Digital Discs: Here Comes Floppy Audio, Unknown.
Specifications—CompuSonics DSP 1000 Digital Disk Recorder/Player, CompuSonics Corporation.
Optical–Disk–Digital Audio System Premieres, B. Robinson, Electronic Engineering Times, Issue 397 Sep. 1, 1986 CDN026284.
Specifications—CompuSonics DSP 1000 Digital Disk Recorder/Player, CompuSonics Corporation.
CompuSonics Business Plan Overview, Jun. 14, 1984 CDN026286.
Cover—Fortune Magazine, Nov. 12, 1984 CDN026289.
Advertisement—CompuSonics Corporate Profile, D. Schwartz, Audio Video International CDN026290.
Toward Electronic Delivery of Music: Sending and Receiving High Fidelity Digital Music, J. Stautner, CompuSonics Corporation CDN026291.
Company Sees Future in Digital Recorders, J. Hendon, Rocky Mountain News Jul. 22, 1984.
Floppy–Disk Audio System, A. Mereson, Science Digest Nov. 1984 CDN026299.
Recording Music on Floppy Disks, A. Zuckerman, High Technology May 1986 CDN026300.
Article—Sound is Big at Consumer Show, L. Mortwaki, Seattle, Washington Times Jun. 8, 1984 CDN026301.
Digital Recording System Uses Floppy Disks, Audio Times, vol. 26, No. 5 May 1984 CDN026302.
CompuSonics Advertisement, CDN026304.
Advertisement—MicroPro's WordStar 2000, CDN026305.
Hi–Fi Floppy, K. Yates, PC World, vol. 3, Issue 4 CDN026306.
The Digitization of Music, K. Yates, PC World, vol. 3, Issue 4 CDN026308.
A Sonic Glossary, K. Yates, PC World, vol. 3, Issue 4 CDN026311.
New Hi–Fi Horizons, D. Ranada, Stereo Review, Dec. 1984 CDN026313.
Specifications and Implementation of a Computer Audio Console for Digital Mixing and Recording, D. Schwartz, AES 76th Convention, NYC Jun. 20, 1984 CDN026317.
A High Speed Telecommunications Interface for Digital Audio Transmission and Reception, H. Sohn, Abstract CDN026319.
The Audio Computer and Its Applications, D. Schwartz; J. Stautner, CompuSonics Corporation CDN026332.
Engineering Your Own Digital Audio Broadcast System, D. Schwartz, CompuSonics Corporation CDN026343.
Tab—Pay 2 Tape '90, CDN026362.
Fax Cover Sheet to Michael Kapp from D. Schwartz, D. Schwartz, Apr. 26, 1990 CDN026363.
Fax Memo to Michael Kapp from D. Schwartz, D. Schwartz, Apr. 26, 1990.

Pay Per Listen Cable Audio System—Notes to Viewgraph Presentation, CompuSonics, CDN026365.
Pay Per Listen Cable Audio System—System Payback Analysis, CompuSonics, CDN026366.
Pay Per Listen Cable Audio System—Provide the In–Home Music Taper with a Wide Variety of Source Material, CompuSonics, CDN026367.
Pay Per Listen Cable Audio System—Provide the In–Home Music Taper with a Wide Variety of Source Material, CompuSonics, CDN026368.
Pay Per Listen Cable Audio System—Audio Database Format Options, CompuSonics, CDN026374.
Pay Per Listen Cable Audio System—Billboard Top 100 LPS Format, CompuSonics, CDN026375.
Pay Per Listen Cable Audio System—Program Publication Options, CompuSonics, CDN026379.
Letter to Shareholder from D. Schwartz, D. Schwartz, Nov. 21, 1984 CDN026381.
Letter to Shareholder from D. Schwartz, D. Schwartz, Oct. 10, 1985 CDN026382.
Display Photograph, CDN026384.
Display Photograph, CDN026385.
CompuSonics DSP2002 Preliminary User Manual, CDN026386.
Display—Hardware Spec, CDN026387.
Internal Data, CDN026388.
DSP–1000 Series, CDN026389.
Digital Marketing Corporation Video Real Estate System, Jun. 7, 1986 CDN026390.
Agenda for Jun. 7, 1988 Meeting, CDN026393.
Agenda for May 31, 1988 Meeting, CompuSonics, CDN026394.
Advertisement—Digilist Video Multiple Listing Service, Digital Marketing Corporation, CDN026395.
Advertisement—Digilist Video Multiple Listing Service, Digital Marketing Corporation, CDN026396.
Advertisement—Digilist Video Multiple Listing Service, Digital Marketing Corporation, CDN026398.
Memo to B. Holmbraker, B. Alderfer, R. Dahl, H. Fong from D. Schwartz, D. Schwartz, CompuSonics Financial/Technical Status Jan. 12, 1987 CDN026399.
Manual—Assembly Procedure for the DSP1500, CDN026401.
Specifications—CompuSonic DSP 1000, CDN026440.
DSP 1000 Digital Audio Disk Recorder Application Notes, CDN026489.
The Home Terminal, International Resource Development, pp. 149–158 Aug. 1978 CDN026745.
Rolm Plugs CBX Into IBM World, Electronic Mail & Message Systems vol. 7, No. 9 May 2, 1983 CDN026768.
Control Video Enters Downline Loading Business, Electronic Mail & Message Systems vol. 7, No. 11 Jun. 1, 1983 CDN026771.
EMMS Article, Electronic Mail & Message Systems vol. 7, No. 14, p. 17 Jul. 15, 1983 CDN026775.
The Other Half of the IBM PC, Electronic Mail & Message Systems vol. 7, No. 16 Aug. 15, 1983 CDN026776.
Electronic Message Systemss and the Home Terminal, Electronic Mail & Message Systems vol. 3, No. 12 Jun. 15, 1979 CDN026779.
EMMS Article, Electronic Mail & Message Systems vol. 3, No. 15, p. 13 Aug. 1, 1979 CDN026784.
EMMS Article, Electronic Mail & Message Systems vol. 6, No. 11, p. 20 Jun. 1, 1982 CDN026785.
EMMS Article, Electronic Mail & Message Systems vol. 6, No. 15, p. 14 Aug. 2, 1982 CDN026786.
EMMS Article, Electronic Mail & Message Systems vol. 6, No. 23 Dec. 1, 1982 CDN026789.
Fiber–Optics Will Shake the Utilities, Electronic Mail & Message Systems vol. 9, No. 20 Nov. 1, 1985 CDN026792.
British Telecom Offers Free Electronic Mail Services, Electronic Mail & Message Systems vol. 10, No. 7 Apr. 1, 1986 CDN026797.
Profit Protection—Risky Business, Electronic Mail & Message Systems vol. 12, No. 16 Aug. 15, 1988 CDN026801.
EMMS Article, Electronic Mail & Message Systems vol. 12, No. 21 Nov. 1, 1988 CDN026811.
CompuSonics to Bow Digital Audio Floppy Disk Player/Recorder; CD Rival?, C. Kaplan, Consumer Electronics Daily, vol. VIII, No. 5, Issue 8 May 10, 1984 CDN026255.
Home Telecommunications in the 1980's, International Resource Development, Inc. Apr. 1980, Report 150 CDN026812.
The Future of Television, International Resource Development, Inc. Aug. 1981, Report 176 CDN026914.
Health, Wealth & Self–Improvement Home Software, International Resource Development, Inc. Sep. 1985, Report 670 CDN026935.
Telecommunications Market Opportunities, International Resource Development, Inc. Nov. 1985, Report 676 CDN026955.
Telepay vs. Videodisc, International Resource Development, Inc. Sep. 1982, Report 510 CDN027013.
Videogames & Electronic Toys, International Resource Development, Inc. May 1983, Report 550 CNDN027034.
Payments Received for Report #558 Downloading and Teledelivery of Computer Software, Games & Music, Kenneth G. Bosomworth, Jan. 9, 2001 CDN027138.
Article—CompuSonics/Carts AT&T Demo, Pro Sound News Sep. 9, 1985 CDN027183.
Intentionally Omitted Documents CDN027190–CDN027734, Mar. 13, 2001 Letter to N. Bigas from R. Gruwell Mar. 9, 2001 Letter M. Neblett from N. Bigas Mar. 5, 2001 Letter to M. Neblett from N. Bigas
Transcription of Videotape, EE 280—Feb. 18 1987—Allison 7 CDN027735.
The Digital Audio Processing Station: A New Concept in Audio Postproduction, J. Moorer; C. Abbott; Peter Nye et al., Journal of Audio Engineering Society, vol. 34, No. 6, Jun. 1986, pp. 454–464 CDN027783.
On Digital I/O Format, T. Doi, Sony Corporation Presented at AES Digital Audio Technical Committee, Hamburg, West Germany Mar. 16, 1981 CDN027794.
PCM Program Transmission and Communication Network for the Norwegian Broadcasting Corporation, R. Andersen; K. Ronning, Journal of the Audio Engineering Society vol. 28, No. 4 Apr. 1980.
A Fibre Optic Multi–Channel Communication Link Developed for Remote Interconnection in a Digital Audio Console, P. Lidbetter S. Douglas, Presented at the 80th Convention, Audio Engineering Society Reprint (Preprint 2330 D6) Mar. 4–7, 1986 CDN 027830.
BBC Digital Audio—A Decade of On–Air Operation, D. Stripp, BBC, London, United Kingdom Collected Papers from the Audio Engineering Society Premiere Conference, Rye, New York Jun. 3–6, 1982 CDN027846.

Processing Systems for the Digital Audio Studio, M. Jones, Neve Electronics Internaitonal Limited, Royston, Hertfordshire, United Kingdom Collected Papers from the Audio Engineering Society Premiere Conference, Rye, New York Jun. 3–6, 1982 CDN027852.

Large Scale Acoustics, D. Hawkins, Studio Sound and Broadcast Engineering Mar. 1985.

BBC Digital Control Vehicle 12 Months On, K. Spencer–Allen, Diary–Diary, Studio Sound, p. 32–33 Nov. 1986.

WDR NEVE DSP Now in Use, Diary–Diary, Studio Sound, p. 18 Aug. 1986.

Digital Mastering Tape One, Studio Sound, pp. 36, 38, 40 Aug. 1986.

Digital Sound Signals: The Present BBC Distribution System and a Proposal for Bit–Rate Reduction by Digital Companding, M. Croll; D. Osborne; C. Spicer, International Broadcasting Convention Sep. 23–27, 1974.

Audio Engineering Handbook, K. Benson, Audio Engineering Handbook All–Digital Studio, pp. 4.37–4.38 Transmission Systems, pp. 4.57 Stereo with Television, p. 4.59 © 1988 CDN027884.

Handbook of Recording Engineering, J. Eargle, The All–Digital Studio, pp. 373–375 © 1986 CDN027892.

Routing of Digital Audio Signals in a Radio Broadcasting Centre, N. Gilchrist; G. Crowe G. Legg, Eleventh International Broadcasting Convention Sep. 19–23, 1986 CDN027897.

Signal Routing in a Digital Sound Studio, G. Roe; C. Caine, Eleventh International Broadcasting Convention Sep. 19–23, 1986 CDN027902.

Multi–Purpose Radio Links System for News Coverage, P. Marchant; I. Buffham, International Broadcasting Convention Sep. 18–21, 1982 CDN027907.

DOCAT—Digital, Optical CATV Trunk System, G. Mogensen; B. Petersen; H. Steffensen, International Broadcasting Convention Sep. 18–21, 1982 CDN027913.

Digital Transmission System for Television, Sound and Associated Data, A. Jones; D. Kitson, Tenth International Broadcasting Convention Sep. 21–25, 1984 CDN027918.

Digital Sound Mixing in the Analogue Studio, M. Jones; D. Langford; D. Tilsley, Tenth International Broadcasting Convention Sep. 21–25, 1984 CDN027923.

Digital Speech Networks, B. Gold, Proceedings of the IEEE, vol. 65, No. 12 Dec. 1977 CDN027939.

The Digital Coding of High–Quality Musical Sound, J. Moorer, Journal of the Audio Engineering Society vol. 27, No. 9, pp. 657–666 Sep. 1979 CDN027962.

Digital Audio for Cable Television, C. Robbins, 1986 NCTA Technical Papers, pp. 21–24 CDN028131.

Speech Understanding Systems, Massachusetts Inst. of Technology, Lincoln Lab., U.S. Department of Commerce, National Technical Information Service May 31, 1973 CDN028138.

Speech Understanding Systems, Massachusetts Inst. of Technology, Lincoln Lab., U.S. Department of Commerce, National Technical Information Service Jan. 15, 1974 CDN028166.

Information Processing Techniques Program, vol. I. Packet Speech/Acoustic Convolvers, Massachusetts Inst. of Techology, Lincoln Lab., U.S. Department of Commerce, National Technical Information Service Jun. 30, 1976 CDN028198.

Speech Analysis Synthesis and Perception, J. Flanagan, Bell Laboratories Channel Vocoders, pp.323–405 CDN028247.

Digitization of Audio: A Comprehensive Examination of Theory, Implementation and Current Practice, B. Blesser, Journal of the Audio Engineering Society vol. 26, No. 10 Oct. 1978 CDN028268.

Personal Computers and Music: The State of the Art, C. Yavelow, Journal of the Audio Engineering Society vol. 35, No. 3 Mar. 1987 CDN028301.

MIDI: Musical Instrument Digital Interface, B. Moog, Journal of the Audio Engineering Society vol. 34, No. 5 May 1986 CDN028325.

How Does a Computer Make Music?, J. Moorer, Computer Music Journal, vol. II, No. 1 pp .32–37 CDN028357.

Lossless Coding for Audio Discs, P. Craven M. Gerzon, Journal of the Audio Engineering Society vol. 44, No. 9 Sep. 1996 CDN028342.

AC–3: Flexible Perceptual Coding for Audio Transmission and Storage, C. Todd; G. Davidson; M. Davis, et al., Paper presented at the 96th Convention of the Audio Engineering Society, Feb. 26–Mar. 1, 1994 Dolby Laboratories, San Francisco CDN028365.

Masterline Software by Phone, Apple II User's Manual KH000015.

Masterline Software by Phone, Commodore 64 User's Manual KH000017.

Masterline Software by Phone, Commodore Software Edition for the Bellsouth Master Module KH000028.

Electronic Games Magazine, Jun. 1983 KH000055.

Gameliner Magazine, Oct. 1983 KH0000181.

Masterline Software by Phone, Issue Two, Apple Software Edition for the Bellsouth Master Module KH000209.

Electronic Games Magazine, Oct. 1983 KH000245.

Apple II Reference Manual, N2K04850.

VAX/VMS Accounting Utility Reference Manual, Sep. 1984 N2K05242.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *